US012596300B2

(12) United States Patent
Wang et al.

(10) Patent No.: US 12,596,300 B2
(45) Date of Patent: Apr. 7, 2026

(54) SYSTEM AND METHOD FOR PERFORMING LOCAL CDU MODELING AND CONTROL IN A VIRTUAL FABRICATION ENVIRONMENT

(71) Applicant: Coventor, Inc., Cary, NC (US)

(72) Inventors: Qing Peng Wang, Shanghai (CN); Yu De Chen, Tainan City (TW); Shi-hao Huang, Kaohsiung City (TW); Rui Bao, Shanghai (CN); Joseph Ervin, San Jose, CA (US)

(73) Assignee: Coventor, Inc., Cary, NC (US)

( * ) Notice: Subject to any disclaimer, the term of this patent is extended or adjusted under 35 U.S.C. 154(b) by 763 days.

(21) Appl. No.: 17/920,477

(22) PCT Filed: Apr. 21, 2021

(86) PCT No.: PCT/US2021/028479
§ 371 (c)(1),
(2) Date: Oct. 21, 2022

(87) PCT Pub. No.: WO2021/216771
PCT Pub. Date: Oct. 28, 2021

(65) Prior Publication Data
US 2023/0205075 A1 Jun. 29, 2023

Related U.S. Application Data

(60) Provisional application No. 63/015,023, filed on Apr. 24, 2020.

(51) Int. Cl.
G03F 1/70 (2012.01)
G06F 30/398 (2020.01)
(Continued)

(52) U.S. Cl.
CPC .............. G03F 1/70 (2013.01); G06F 30/398 (2020.01); G06F 2119/18 (2020.01); G06F 2119/22 (2020.01)

(58) Field of Classification Search
CPC ..... G03F 1/70; G03F 1/72; G03F 1/76; G06F 30/398; G06F 2119/18; G06F 2119/22
(Continued)

(56) References Cited

U.S. PATENT DOCUMENTS 7,286,897 B2 10/2007 Liu et al.
2002/0158185 A1* 10/2002 Nelson .................. G03F 9/7019
430/30

(Continued)

FOREIGN PATENT DOCUMENTS

KR 10-2016-0116285 A 10/2016
TW 201901965 A 1/2019

OTHER PUBLICATIONS

Jee et al., EUV local CDU healing performance and modeling capability towards 5nm node. Proc of SPIE. 2017;10450:1045017-1-1045017-9.
(Continued)

*Primary Examiner* — Paul Dinh
(74) *Attorney, Agent, or Firm* — Weaver Austin Villeneuve & Sampson LLP

(57) ABSTRACT

Systems and methods for performing local Critical Dimension Uniformity (CDU) modeling in a virtual fabrication environment are discussed. More particularly, local CD variance is replicated in the virtual fabrication environment in order to produce a CDU mask that can be used during a virtual fabrication sequence to produce more accurate results reflecting the CD variance of features that occurs in a pattern for a semiconductor device being physically fabricated.

21 Claims, 25 Drawing Sheets

(51) Int. Cl.
　　*G06F 119/18*　　　(2020.01)
　　*G06F 119/22*　　　(2020.01)
(58) Field of Classification Search
　　USPC ........................................................... 716/52
　　See application file for complete search history.

(56) References Cited

U.S. PATENT DOCUMENTS

| | | |
|---|---|---|
| 2007/0065729 A1 | 3/2007 | Zait et al. |
| 2008/0195359 A1* | 8/2008 | Barker ................... G05B 17/02 |
| | | 703/2 |
| 2008/0206654 A1* | 8/2008 | Abe ...................... G03F 7/2061 |
| | | 430/311 |
| 2010/0268367 A1 | 10/2010 | Wu et al. |
| 2011/0271239 A1 | 11/2011 | Lu et al. |
| 2012/0167031 A1 | 6/2012 | Jain et al. |
| 2013/0077101 A1 | 3/2013 | Sharoni et al. |
| 2017/0004250 A1 | 1/2017 | Robles |
| 2017/0064204 A1* | 3/2017 | Sapiro ....................... G06T 5/20 |
| 2018/0165397 A1* | 6/2018 | Chang ....................... G03F 1/36 |
| 2020/0057833 A1* | 2/2020 | Lu ............................. G03F 1/36 |

OTHER PUBLICATIONS

International Preliminary Report on Patentability and Written Opinion dated Nov. 3, 2022 in PCT Application No. PCT/US2021/028479.
International Search Report and Written Opinion dated Aug. 12, 2021 in PCT Application No. PCT/US2021/028479.
TW Office Action dated Apr. 7, 2025 in TW Application No. 110114253, with English Translation..

\* cited by examiner

Figure 6:
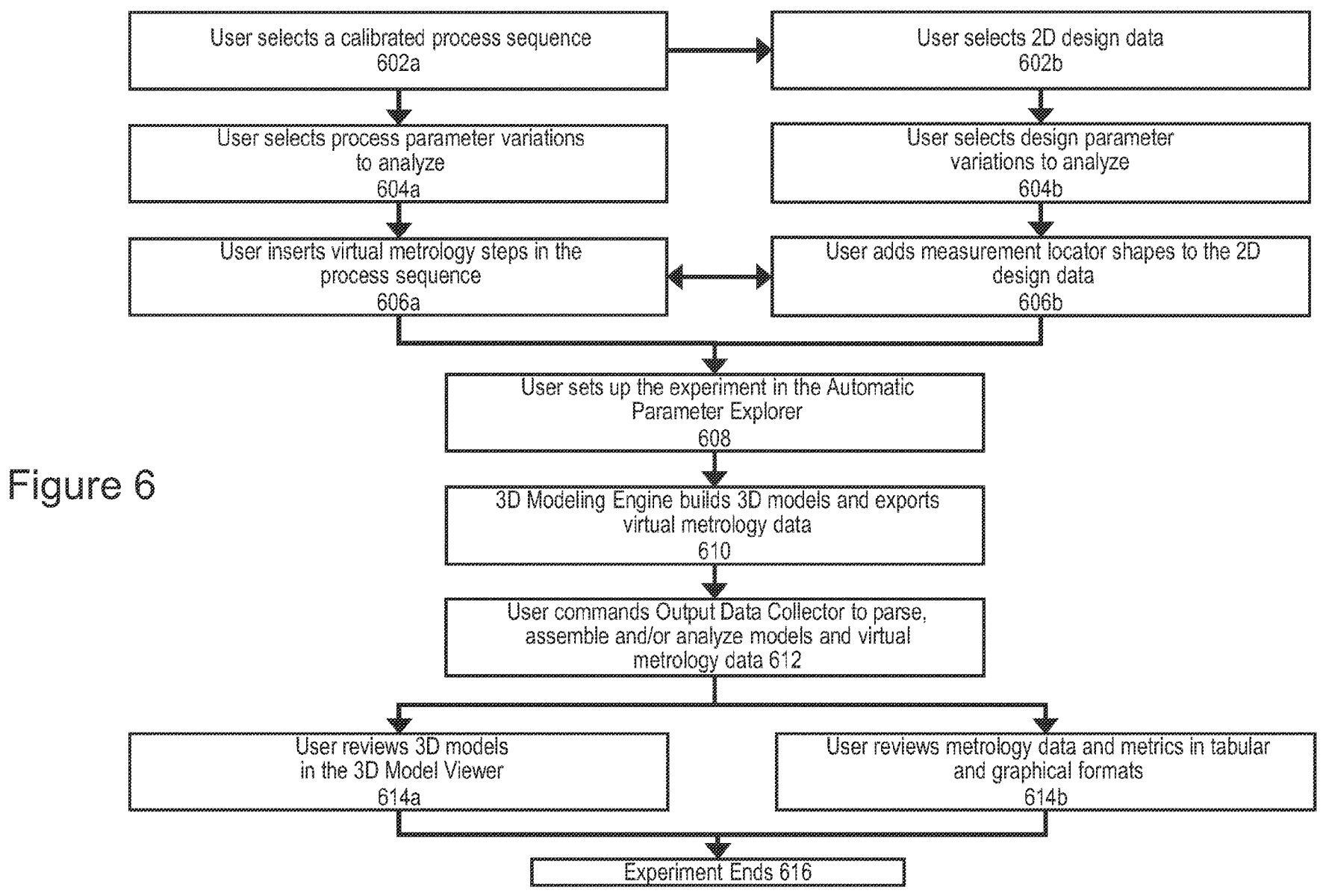

User selects a calibrated process sequence
602a

User selects 2D design data
602b

User selects process parameter variations to analyze
604a

User selects design parameter variations to analyze
604b

User inserts virtual metrology steps in the process sequence
606a

User adds measurement locator shapes to the 2D design data
606b

User sets up the experiment in the Automatic Parameter Explorer
608

3D Modeling Engine builds 3D models and exports virtual metrology data
610

User commands Output Data Collector to parse, assemble and/or analyze models and virtual metrology data 612

User reviews 3D models in the 3D Model Viewer
614a

User reviews metrology data and metrics in tabular and graphical formats
614b

Experiment Ends 616

| Assembly File | C:\STI_Example\Virtual_3way_Grid\STI_Example.zam |
|---|---|
| Process File | C:\STI_Example\Virtual_3way_Grid\STI_Example.vproc |
| Layout File | C:\STI_Example\Virtual_3way_Grid\Demo_Layouts.cat |
| Layer Map File | |
| Top Cell | Cell6x6 |
| Output directory | STI_Example_batch |
| Working directory | C:\STI_Example\Virtual_3way_Grid |

802 804

| Run | 1.19-depth | 1.22-depth | 2-depth | DBT_STEP_DBT | THK_NITRI_LT | RMS_STEP_RMS | OOB_STEP_OOB |
|---|---|---|---|---|---|---|---|
| 0 (1) | 15.5 | 52.5 | 2 | 24.381696 | 167 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.37036 | 4.127763 |
| 3 (4) | 22.25 | 52.5 | 2 | 33.890625 | 157 | 2.116406 | 0.856027 |
| 4 (5) | 24.5 | 52.5 | 2 | 37.047595 | 154 | NaN | NaN |
| 5 (6) | 15.5 | 56.25 | 2 | 24.381696 | 167 | 11.971823 | 10.651568 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 2 | 33.890625 | 157 | 2.012943 | 0.780521 |
| 9 (10) | 24.5 | 56.25 | 2 | 37.047595 | 153 | NaN | NaN |
| 10 (11) | 15.5 | 60 | 2 | 24.381696 | 167 | 11.795147 | 10.529056 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.894331 | NaN |
| 14 (15) | 24.5 | 60 | 2 | 37.047595 | 153 | NaN | NaN |
| 15 (16) | 15.5 | 63.75 | 2 | 24.381696 | 167 | 11.693068 | 10.415309 |
| 16 (17) | 17.75 | 63.75 | 2 | 27.539265 | 163 | 8.378849 | 7.159459 |

124

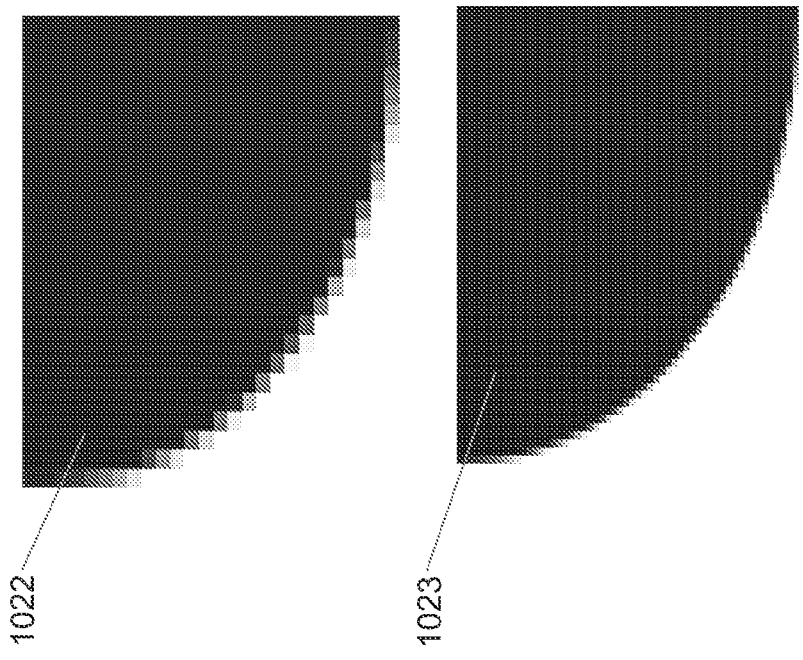
Figure 10B
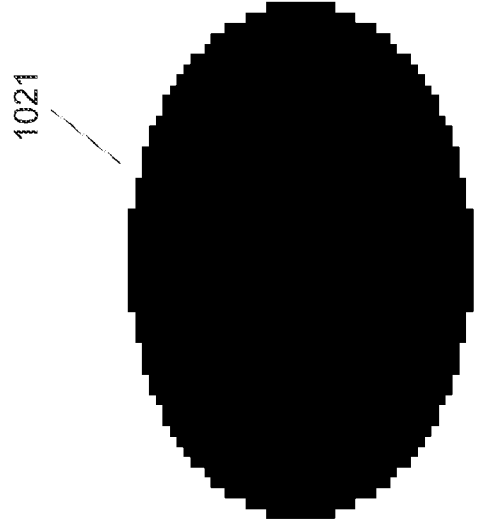

1102

1104

1106

Figure 12
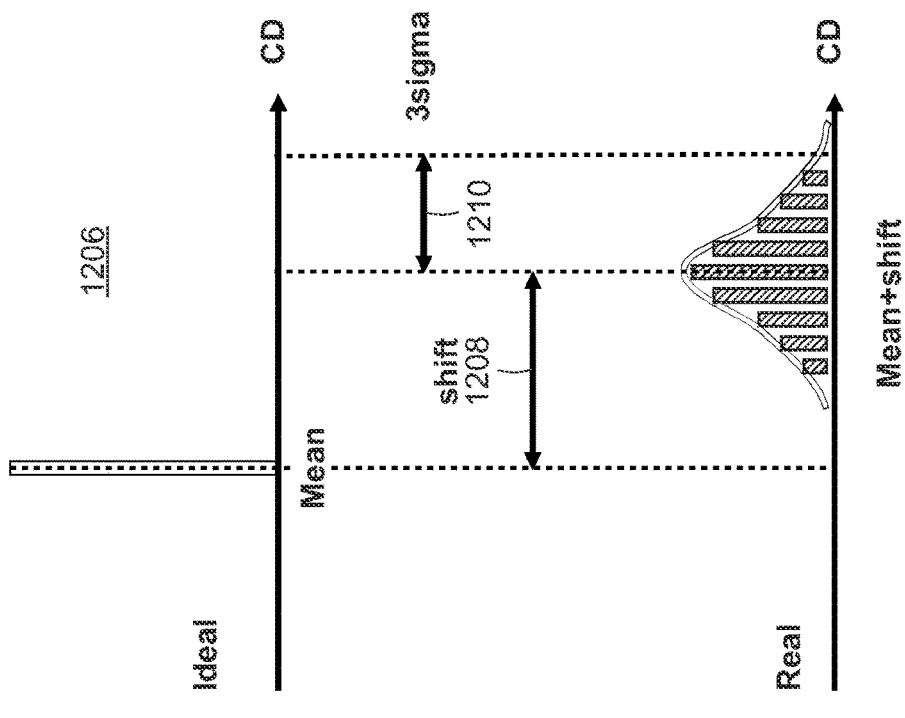
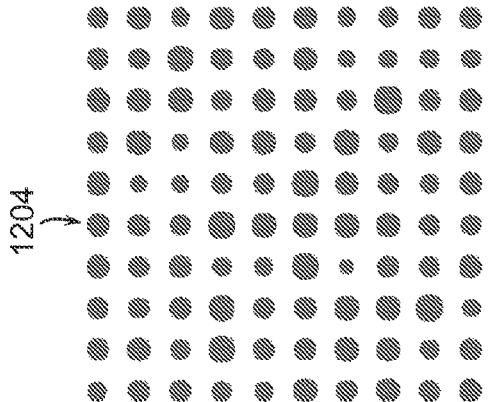
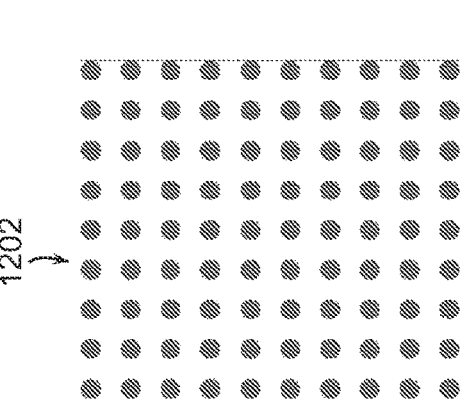

Figure 13

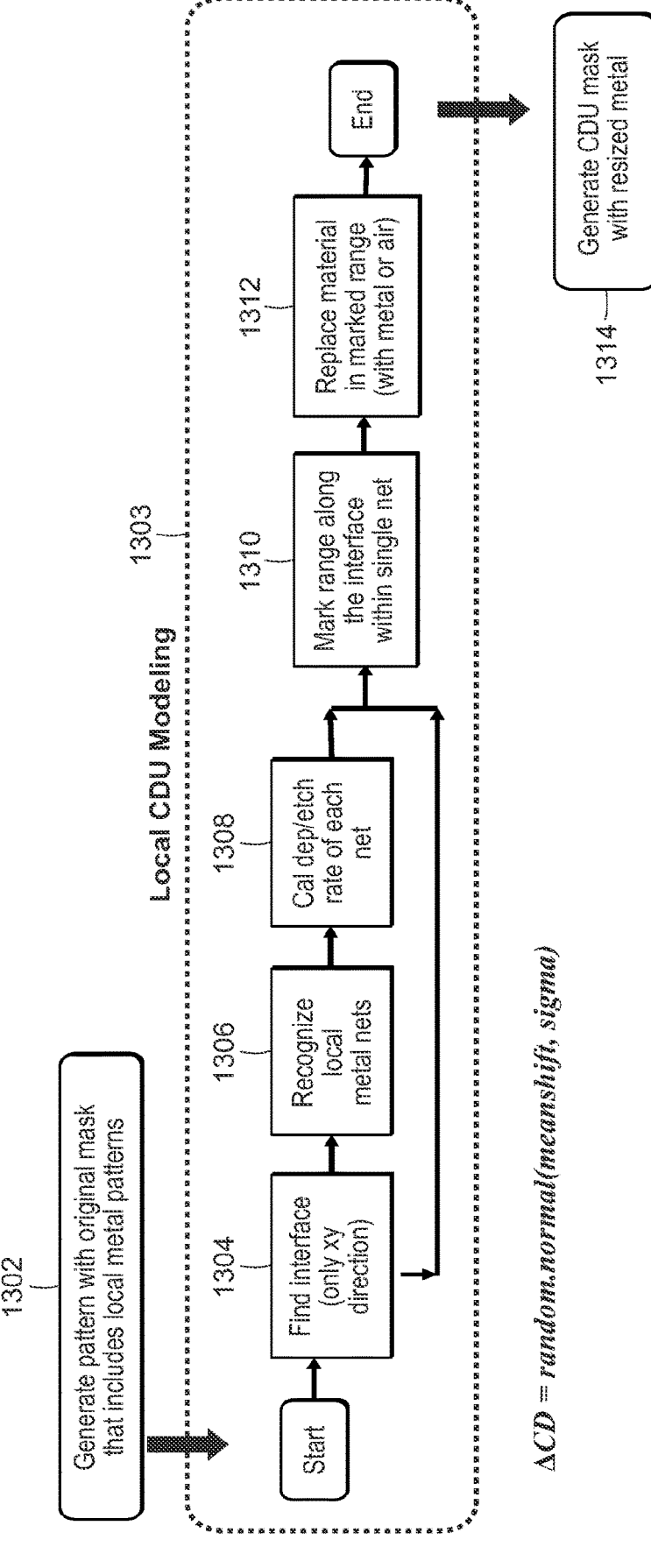

1302
Generate pattern with original mask that includes local metal patterns

Local CDU Modeling
1303

Start

1304
Find interface (only xy direction)

1306
Recognize local metal nets

1308
Cal dep/etch rate of each net

1310
Mark range along the interface within single net

1312
Replace material in marked range (with metal or air)

End

1314
Generate CDU mask with resized metal $\Delta CD = random.normal(meanshift, sigma)$

Figure 18

Process Steps    1800

| r | Lo | Action | Name | Materials(s) |
|---|----|--------|------|--------------|
| | | Wafer Setup | Wafer Setup | /Silicon/Si_X**** |
| .1 | | Sequence | Original Mask | |
| .2 | | Copy Wafe**** | Wafer Operati**** | |
| .3 | | Planarizi**** | Planar Deposit | /Organics/Res**** |
| | | Expose Ma**** | Expose Material | /Organics/Res**** |
| .1 | | Sequence | Sequence | |
| .2 | | Copy Wafe**** | Wafer Operati**** | |
| .3 | | Conformal**** | Conformal Dep*** | /Metals/Au |
| .4 | | Expose Ma**** | Expose Material | /Metals/Au |
| .5 | | Local CDU Modeling Step | Local CDU Modeling Step | |
| | | Mask Oper*** | Mask Operations | |
| .1 | | Sequence | CDU mask | |
| .2 | | Planarizi**** | Planar Deposit | /Organics/Res**** |
| | | Expose Ma**** | Expose Material | /Organics/Res**** |

Receive process sequence with local CDU modeling step — 2102

Generate pattern from first mask in virtual fabrication environment that includes metal patterns respectively associated with metal features — 2104

Perform local CDU modeling step to resize metal features — 2106

Generate new CDU mask based on the resizing — 2108

Perform virtual fabrication using CDU mask — 2110

SYSTEM AND METHOD FOR PERFORMING LOCAL CDU MODELING AND CONTROL IN A VIRTUAL FABRICATION ENVIRONMENT

RELATED APPLICATIONS

This application is a U.S. National Stage Application filed under 35 U.S.C. § 371, based on International Patent Application No. PCT/US2021/028479, filed on Apr. 21, 2021, which claims the benefit of, and priority to, U.S. Provisional Patent Application No. 63/015,023, filed Apr. 24, 2020, entitled "System and Method for Performing Local CDU Modeling and Control in a Virtual Fabrication Environment", the contents of each of which are incorporated herein by reference in their entirety.

BACKGROUND

Semiconductor development organizations at integrated device manufacturers (IDMs) and independent foundries spend significant resources developing the integrated sequence of process operations used to fabricate the chips (integrated circuits (ICs)) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive, as each experimental wafer may cost $3,000-$10,000. Recent semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide the ability to perform local critical dimension uniformity (CDU) control in a virtual fabrication environment. More particularly, embodiments enable the virtual fabrication environment to model variation in critical dimension (CD) within individual metal patterns (associated with a metal feature) isolated from a pattern produced in the fabrication sequence. After generating a pattern for a semiconductor device structure with an original mask, a local CDU modeling step within the process sequence is executed that identifies each individual metal pattern within the pattern as a separate metal net. The local CDU modeling step then resizes each metal net to reflect a random CD variance for the isolated pattern. The group of resized metal nets may then be used to create a revised mask, a CDU mask. The CDU mask may be used in the virtual fabrication environment to perform more accurate virtual fabrication reflective of the CD variation of the features that would occur in the real life fab. In some embodiments, user configurable parameters may be selected for the CDU modeling step in order to control the local CDU and the ellipticity of the features.

In one embodiment, a computing device-implemented method for performing local Critical Dimension Uniformity (CDU) modeling and control within a virtual fabrication environment includes receiving in the virtual fabrication environment a selection of a process sequence and design data for a semiconductor device structure to be virtually fabricated. The process sequence includes a local CDU modeling step. The method also generates in the virtual fabrication environment during virtual fabrication of the semiconductor device structure a pattern from a first mask using the process sequence and the design data. The pattern includes multiple metal patterns, each of the metal patterns associated with a metal feature. The method recognizes each of the metal patterns as a separate net and resizes each net along an interface by calculating a random normal CD variation for the net. A CDU mask is generated based on the resized nets and the CDU mask is used to perform virtual fabrication of the semiconductor device structure in the virtual fabrication environment.

In another embodiment, a system for performing local CDU modeling and control in a virtual fabrication environment includes at least one computing device and a display surface. The at least one computing device is equipped with one or more processors and is configured to generate a virtual fabrication environment that is configured to receive a selection of a process sequence and design data for a semiconductor device structure to be virtually fabricated. The process sequence includes a local CDU modeling step. The virtual fabrication environment is also configured to generate during virtual fabrication a pattern from a first mask using the process sequence and the design data, the pattern including multiple metal patterns. Each of the metal patterns is associated with a metal feature. The virtual fabrication environment is further configured to execute the local CDU modeling step to recognize each of the metal patterns as a separate net and resize each net along an interface by calculating a random normal CD variation for the net. Additionally, the virtual fabrication environment is configured to generate a CDU mask based on the resized nets and use the CDU mask to perform virtual fabrication of the semiconductor device structure. The display surface is in communication with the computing device and is configured to display data from the virtual fabrication environment.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 6 depicts an exemplary sequence of steps performed in the virtual fabrication environment to set up and perform a virtual experiment generating virtual metrology measurement data for multiple semiconductor device structure models:

FIG. 8 depicts an exemplary tabular-formatted display of virtual metrology data generated in a virtual experiment provided by the virtual fabrication environment:

FIG. 10B depicts exemplary staircasing effects addressed by adjusting voxel size:

FIG. 12 depicts an example of CD variation between an ideal pattern specified in a first mask and the pattern after transfer to the resist:

FIG. 13 depicts an exemplary sequence of steps for performing local CDU modeling in an exemplary embodiment:

FIG. 18 depicts a process sequence for a semiconductor device structure in an exemplary embodiment:

DETAILED DESCRIPTION

During lithography operations in semiconductor device fabrication, a mask pattern is transferred to an area of photoresist on a wafer. For example, the pattern may be transferred using traditional photolithography techniques or advanced node techniques such as those using the shorter wavelengths of Extreme Ultraviolet Lithography (EUVL). The pattern being transferred may include a number of different geometrical features such as lines with different widths, openings of different shapes and sizes (e.g. elliptical, circular, etc.) and other types of features. Each of these features is specified in terms of its critical dimension (CD). For example, a CD referring to a line may be specified in terms of its width while a CD for a circular-shaped opening may be specified in terms of the opening's diameter or its ellipticity resulting from a ratio of its x and y dimensions. Ideally the pattern from the mask would be transferred to the photoresist with the CD of the transferred features showing no variation from those specified in the mask and during virtual fabrication this is of course possible. However, in a physical fabrication environment, process variability can result in individual features in the transferred pattern exhibiting non-uniformity (variance) from the specified feature CDs. In a physical fab, the CD variance can be detected by performing post-lithography CD measurements using a Critical Dimension-Scanning Electron Microscope (CD-SEM) and various correction measures may be attempted to remedy detected errors. Failing to adequately control local CDU for features occurring in only a part of the pattern (local CDU control) can negatively impact device yield and this is especially true with the increasingly smaller features required in advanced node fabrication. Accordingly, local CDU control has taken on greater importance. However, in virtual fabrication environments, it has conventionally been difficult to properly and efficiently model local CDU.

Embodiments of the present invention provide a virtual fabrication environment enabling local CDU modeling and control to occur as part of the execution of a process sequence to enable more accurate virtual fabrication that accounts for local CD variation. However, prior to discussing the local CDU modeling and control provided by embodiments in greater detail, an exemplary 3D virtual fabrication environment which may be utilized to practice the embodiments is first described.

Exemplary Virtual Fabrication Environment

Figure 1:
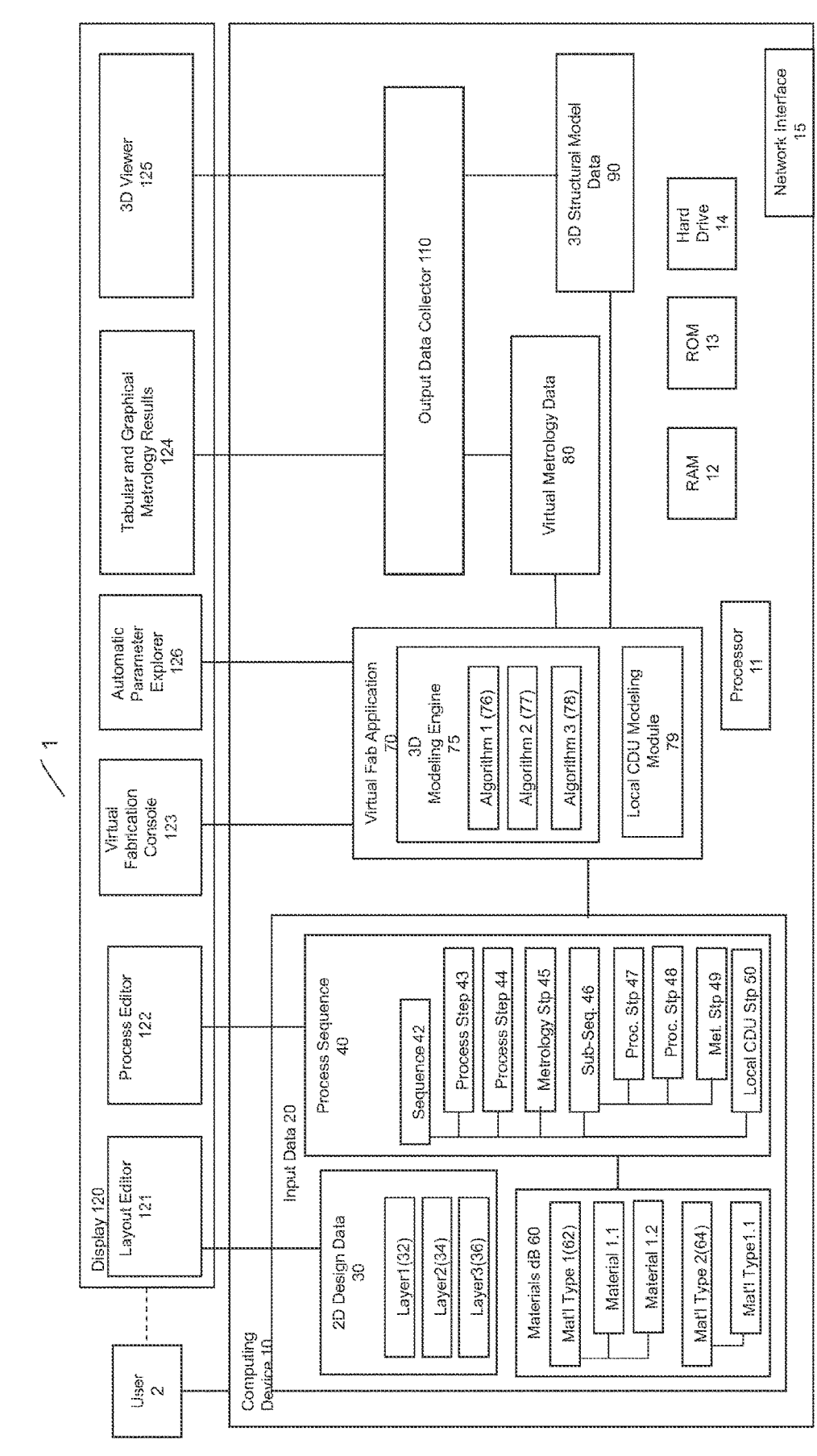
FIG. 1 depicts an exemplary virtual fabrication environment suitable for practicing an embodiment of the present invention.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with a processor 11 and able to support the operations of 3D modeling engine 75 (described further below). The processor may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. Virtual fabrication application 70 may also include local CDU modeling module 79 containing executable instructions for modeling local CDU operations. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. In an alternative embodiment the measurement location may be specified by alternate means such as (x, y) coordinates in the 2D design data or some other means of specifying a location in the 2D design data 30 instead of through the use of a locator shape. Process sequence may also include one or more local CDU modeling steps 50 that indicate a point in the process sequence during a virtual fabrication run at which a local CDU modeling operation should be performed as described further herein. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Figure 2:
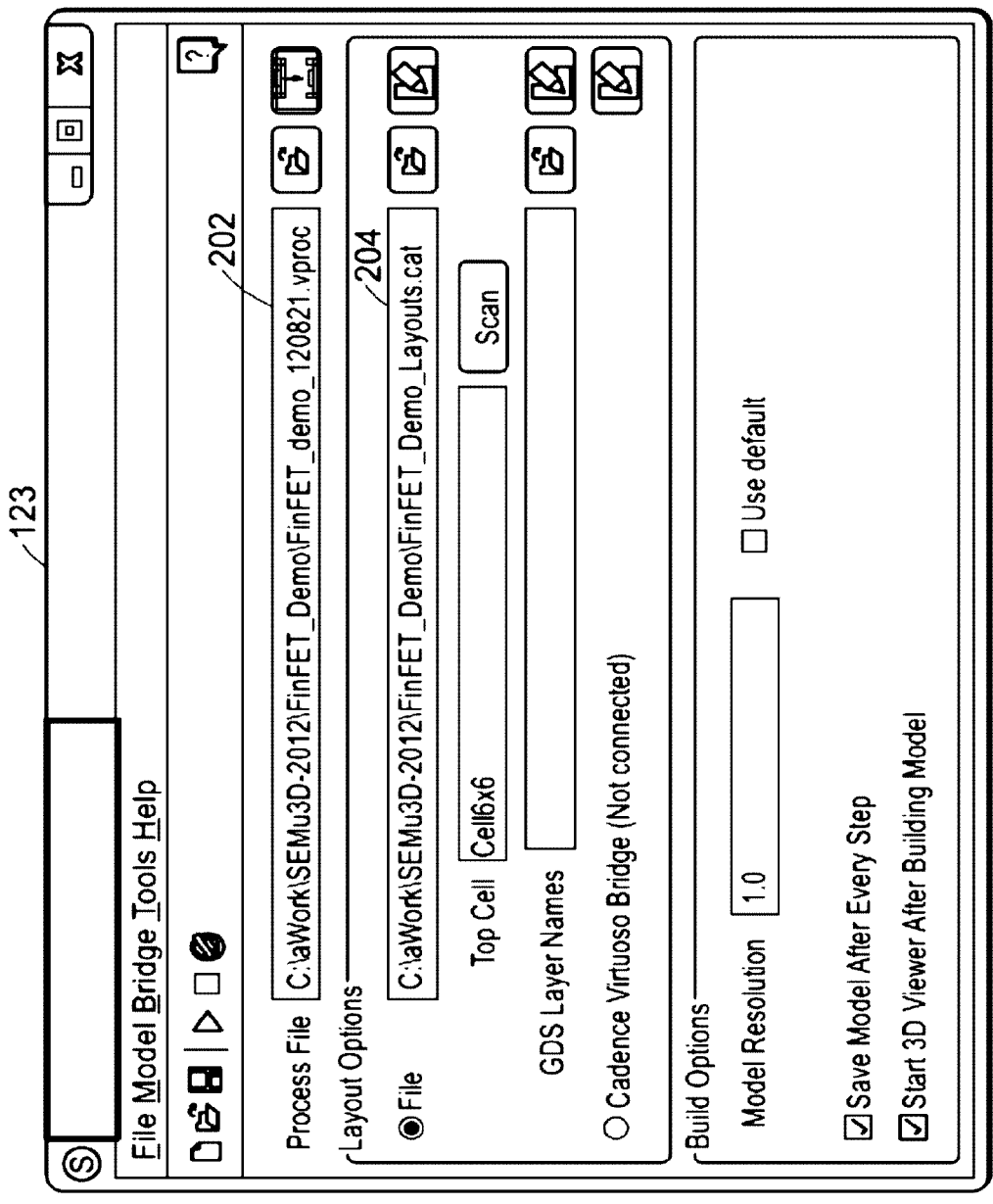
FIG. 2 depicts an exemplary virtual fabrication console provided by the virtual fabrication environment.

FIG. 2 depicts an exemplary virtual fabrication console 123 provided by the virtual fabrication environment to set up a virtual fabrication run. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
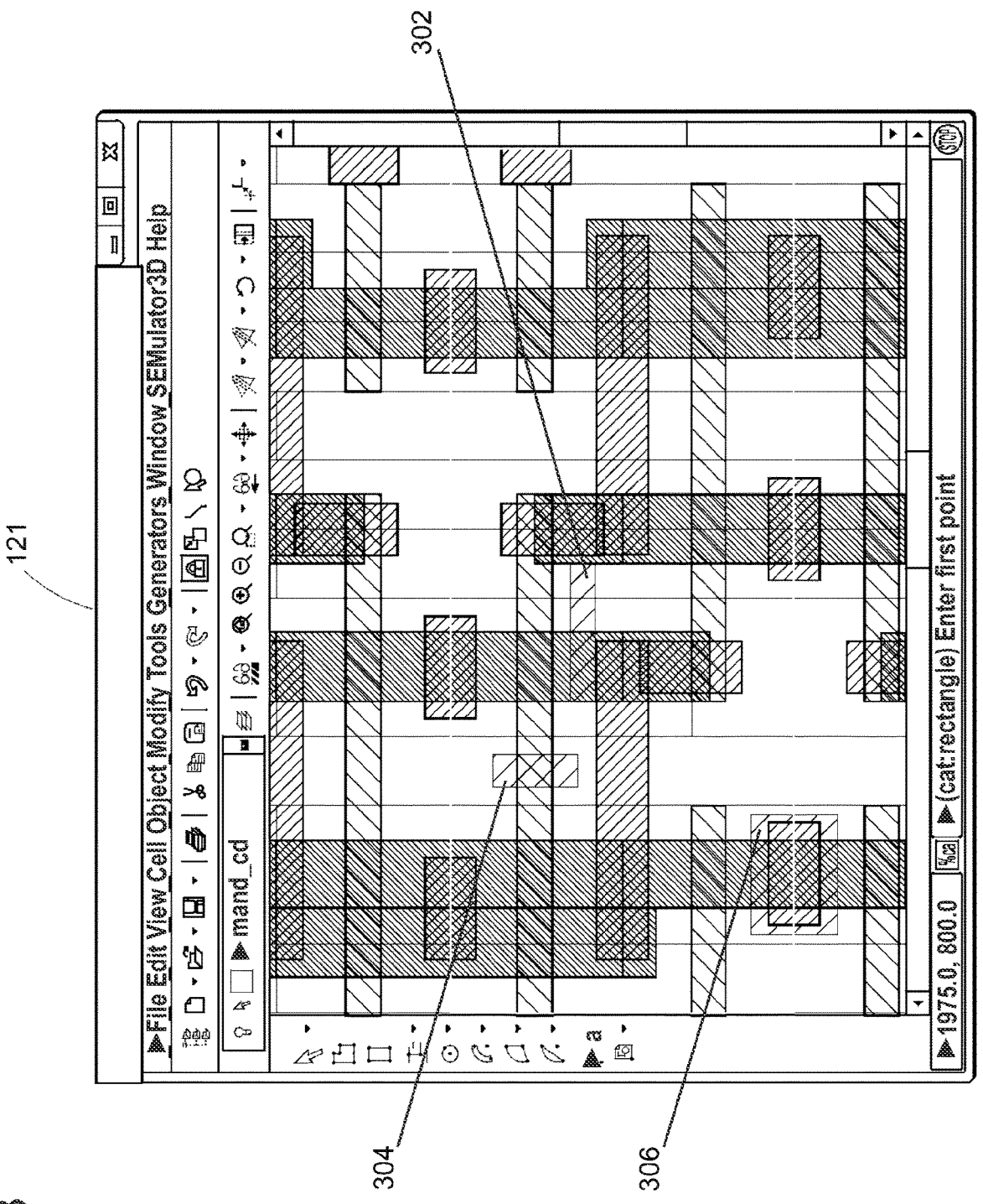
FIG. 3 depicts an exemplary layout editor provided by the virtual fabrication environment.

FIG. 3 depicts an exemplary layout editor provided by the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes should also be considered within the scope of the present invention. The design data is used in combination with the process data and materials database to build a 3D structural model.

Figure 4:
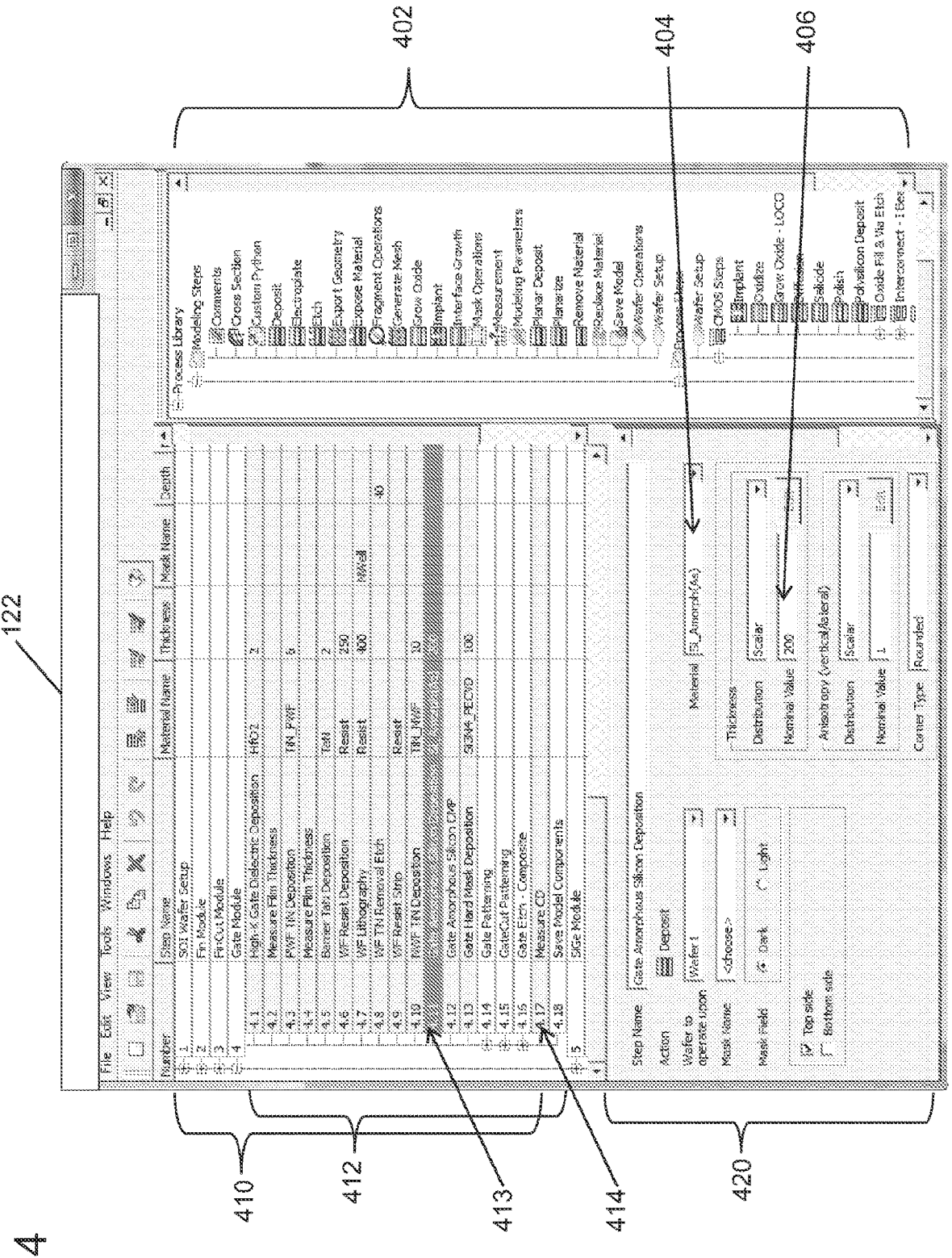
FIG. 4 depicts an exemplary process editor provided by the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 provided by the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. By inserting the virtual metrology steps directly in the fabrication sequence, the embodiment of the present invention allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
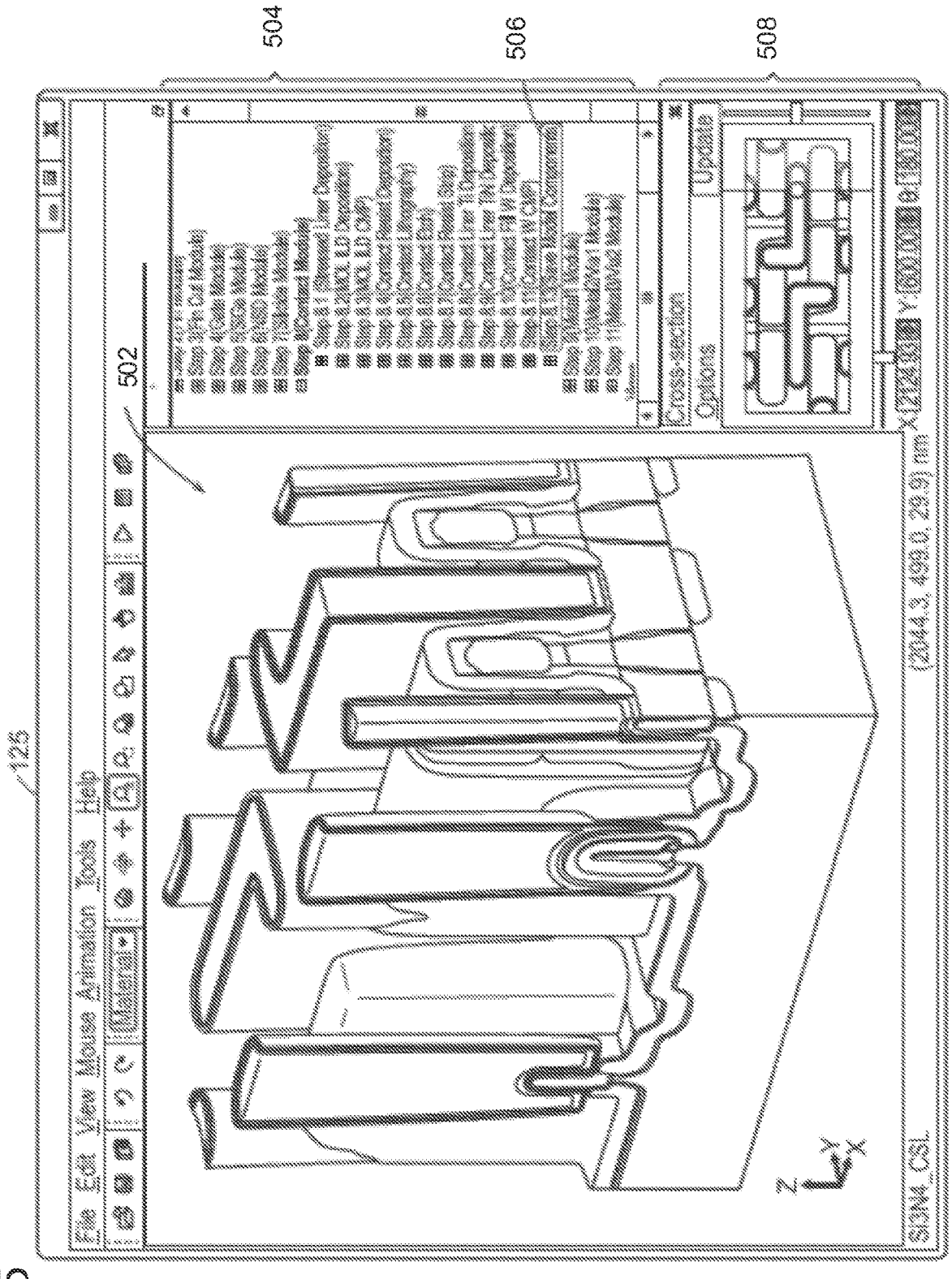
FIG. 5 depicts an exemplary 3D viewer provided by the virtual fabrication environment.

FIG. 5 depicts an exemplary 3D viewer 125 provided by the virtual fabrication environment. The 3D viewer 75 may include a 3D view canvas 502 for displaying 3D models generated by the 3D modeling engine 75. The 3D viewer 75 may display saved states 504 in the process sequence and allow a particular state to be selected 506 and appear in the 3D view canvas. The 3D Viewer provides functionality such as zoom in/out, rotation, translation, cross section, etc. Optionally, the user may activate a cross section view in the 3D view canvas 502 and manipulate the location of the cross section using a miniature top view 508.

While building a single structural model can be valuable, there is increased value in virtual fabrication that builds a large number of models. The virtual fabrication environment enables a user to create and run a virtual experiment. In a virtual experiment of the present invention, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability provided by the embodiments of the present invention may be used to mimic two fundamental types of experiments that are typically performed in the physical fab environment. Firstly, fabrication processes vary naturally in a stochastic (non-deterministic) fashion. As explained herein, embodiments of the present invention use a fundamentally deterministic approach for each virtual fabrication run that nevertheless can predict non-deterministic results by conducting multiple runs. The virtual experiment mode provided by an embodiment of the present invention allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode of the present invention enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment embodiments of the present invention can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 7:
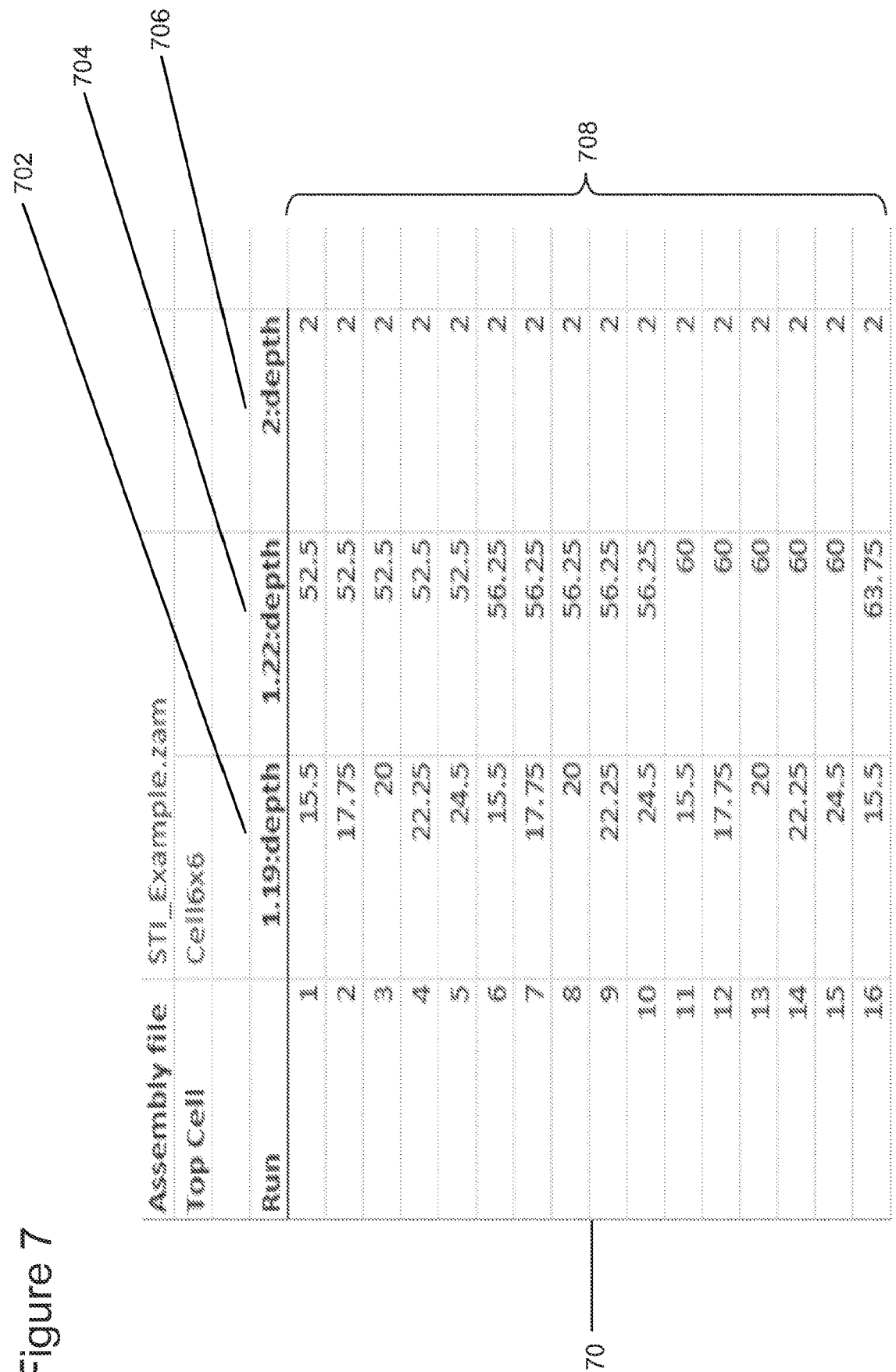
FIG. 7 depicts an exemplary parameter explorer view used to provide process parameters for a virtual experiment provided by the virtual fabrication environment.

FIG. 6 depicts an exemplary sequence of steps that may be performed in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 602a) and identifying/creating 2D design data (step 602b). The user may select process parameter variations to analyze (step 604a) and/or design parameter variations to analyze (step 604b). The user inserts one or more virtual metrology steps in the process sequence as set forth above (step 606a) and adds measurement locator shapes to the 2D design data (step 606b). The user may set up the virtual experiment with the aid of a specialized user interface, an automatic parameter explorer 126 (step 608). An exemplary automatic parameter explorer is depicted in FIG. 7 and may display, and allow the user to vary, the process parameters to be varied 702, 704, 706 and the list of 3D models to be built with their corresponding different parameter values 708. The parameter ranges for a virtual experiment can be specified in a tabular format. The 3D modeling engine 75 builds the 3D models and exports the virtual metrology measurement data for review (step 610). The virtual experiment mode provides output data handling from all Virtual Measurement/Metrology operations. The output data from the virtual metrology measurements may be parsed and assembled into a useful form (step 612).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 8 depicts an exemplary tabular-formatted display of virtual metrology data generated by a virtual experiment. In the tabular formatted display, the virtual metrology data collected during the virtual experiment 802 and the list of virtual fabrication runs 804 may be displayed.

Figure 9:
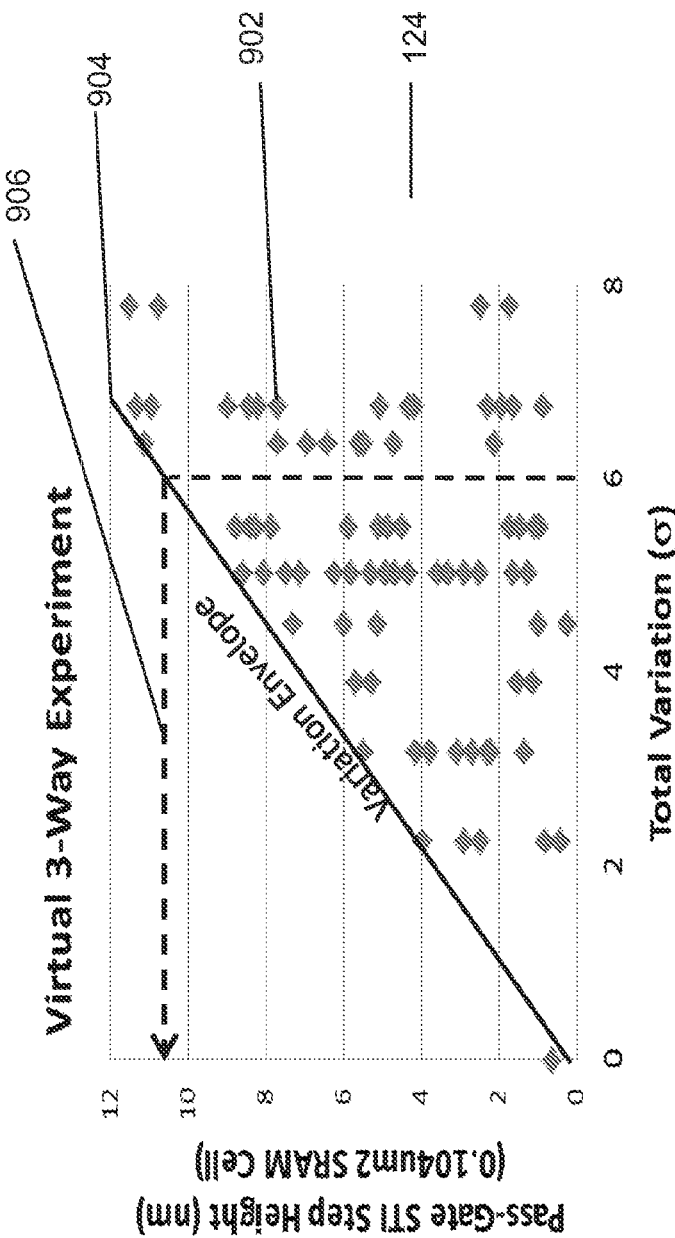
FIG. 9 depicts an exemplary graphical display of virtual metrology data generated in a virtual experiment provided by the virtual fabrication environment.

FIG. 9 depicts an exemplary 2D X-Y graphical plot display of virtual metrology data generated by a virtual experiment. The results of the example depicted in FIG. 7, the total variation in shallow trench isolation (STI) step height due to varying 3 parameters in preceding steps of the process sequence is shown. Each diamond 902 represents a virtual fabrication run. The variation envelope 904 is also displayed as is the depicted conclusion 906 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 614a) and review the virtual metrology measurement data and metrics presented for each virtual fabrication run (step 614b). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 of the present invention uses multiple cores and/or processors to perform individual modeling steps. In addition, the structural models for different parameter values in a set are completely independent and can therefore be built in parallel using multiple cores, multiple processors, or multiple systems.

3D modeling engine 75 may represent the underlying structural model using a voxel-based implicit geometry representation. Voxels are essentially 3D pixels. Each voxel is a cube of the same size, and may contain one or more materials, or no materials. An implicit geometry representation is one in which the interface between materials in the 3D structural model are defined without an explicit representation of the (x,y,z) coordinate locations of that interface. Many of the operations performed by the 3D modeling engine are voxel modeling operations. Modeling operations based on a digital voxel representation are far more robust than the corresponding operations in a conventional analog solid modeling kernel (e.g. a NURBS-based solid modeling kernel). Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

Some simulation tools require a volume mesh to be generated from some form of explicit boundary representation and previous solutions exist for creating a volume mesh of B-rep geometry or from surface meshes. Such volume meshes for finite-element or finite-volume simulation techniques will preserve the location of the interface between materials to a high level of accuracy. Such a volume mesh is called a boundary-conforming mesh or simply a conformal mesh. A key feature of such a mesh is that no element crosses the boundary between materials. In other words, for a volume mesh of tetrahedral elements, then each element is wholly within one material and thus no tetrahedron contains more than one material. However, neither B-rep and similar solid modeling kernels, nor surface mesh representations are optimal for virtual fabrication. Solid modeling kernels generally rely on a large number of heuristic rules to deal with various geometric situations, and modeling operations may fail when the heuristic rules do not properly anticipate a situation. Geometry representations that instead represent the boundaries implicitly do not suffer from these problems. A virtual fabrication system that uses an implicit representation exclusively thus has significant advantages, even if it may not represent the interfaces as accurately.

Figure 10A:
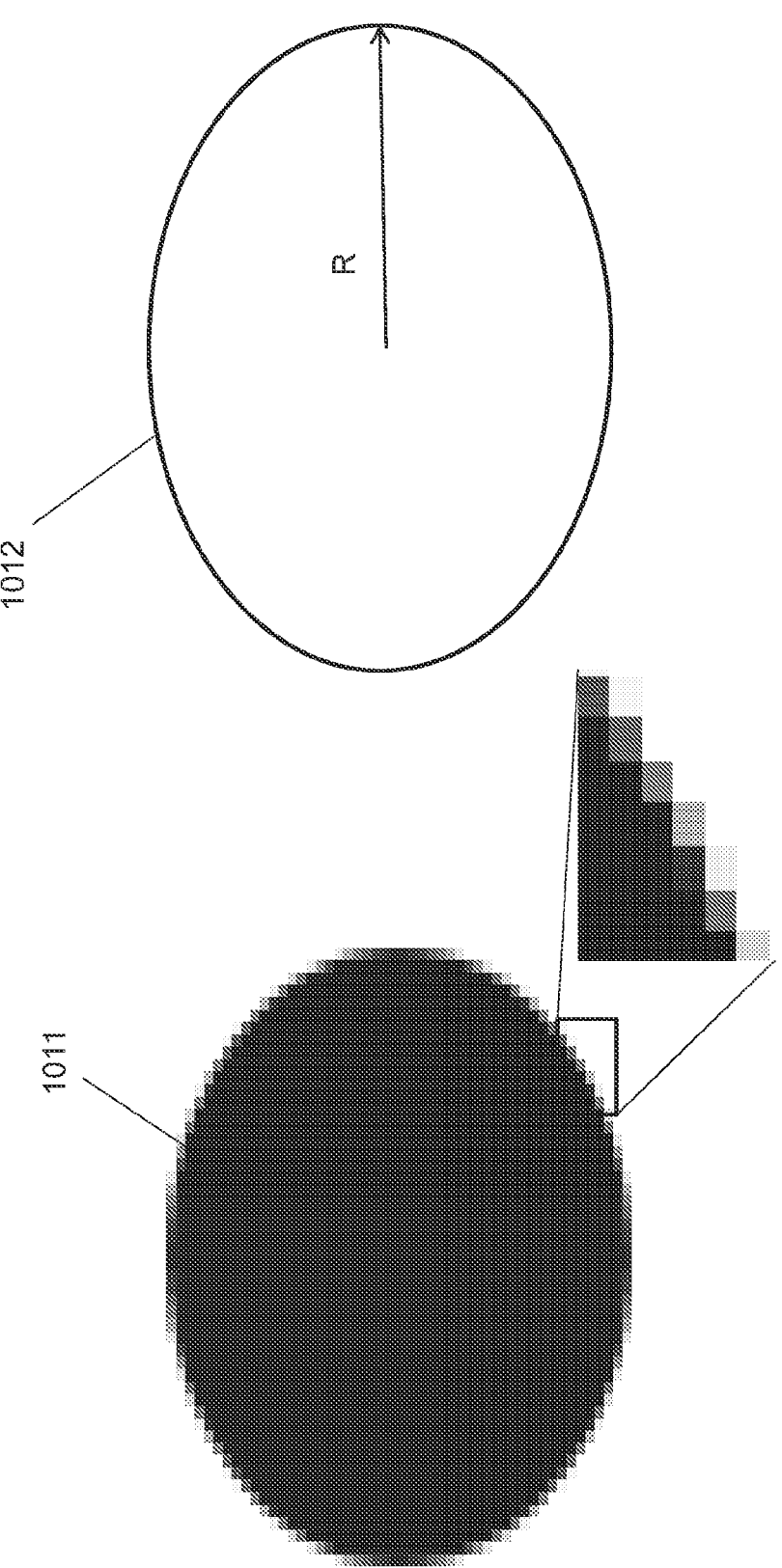
FIG. 10A depicts exemplary voxel-based representations of a circle boundary.

Geometric data represented with voxels implicitly represents the interface between materials. FIG. 10A illustrates this concept in two dimensions for a circle. A B-rep representation 1012 may represent the circle as the equation of a circle with radius R with material 1 inside the circle with material 2 outside. In contrast, a voxel representation of the circle 1011 is an array of cubes where each cube stores the material identification numbers within it, and the relative amounts of each material. The grayscale darkness of the squares in 1011 indicates the relative percentage of material 1 versus material 2. Black indicates 100% material 1 and 0% material 2, and white indicates 0% material 1 and 100% material 2. Since the circle cuts through the voxels along its path, grayscale voxels on the boundary of the circle are partially filled with each material and the darkness of gray indicates the fill fraction. Partially filled voxels indicate that the boundary crosses through that voxel, but does not indicate where and with what orientation. The fill fractions of a boundary voxel and others in its neighborhood may be used to determine the boundary explicitly.

Material properties at a location within the geometry are approximated using the properties of the majority material within each voxel. For instance, in an operation to determine electrical resistance if a boundary voxel is more than 50% of material 2 in circle 1011, then the bulk resistivity of material 2 is used for all values of x within that voxel, and similarly voxels of 50% or more of material 1 use bulk resistivity of material 1. This is equivalent to filling those voxels full of the majority material as shown in FIG. 10B, circle 1021. This approach incurs what is called 'staircasing' error in the solution over methods that explicitly know the boundary location, and thus know precisely the material at each location, x. One method to compensate for staircasing error is to decrease the size of each voxel when performing the virtual fabrication of the 3D model and thus reduce the volume of boundary voxels. For instance, circle portion 1022 is part of the circle of the voxel representation in 1011, and circle portion 1023 is the same part of the circle built with voxels one half of the size in each dimension. The volume taken up by boundary voxels is much less with the smaller voxel size and thus the error would be less. It should be noted however that decreasing the voxel size greatly increases both the virtual fabrication computation time as well as the simulation time which may lead to unacceptable results in some circumstances.

Local CDU Modeling and Control

Embodiments of the present invention enable a virtual fabrication environment to account for the local variation in CDU that typically occurs in the physical fab during the fabrication process in order to make the virtual fabrication process more accurate. CD variance of features in a pattern for a semiconductor device being physically fabricated generally have a normal distribution with mean shift and sigma. The variance occurring within each local pattern is a random normal distribution. For example, some hole features may be narrower or wider than specified in the mask. Similarly, line width may vary from a specified line width value in parts of the pattern. Embodiments enable this type of local CD variance to be replicated in the virtual fabrication environment in order to produce a CDU mask that can be used during virtual fabrication to produce more accurate results.

Embodiments enable a local CDU modeling step, optionally with user-specified parameters, to be inserted into a process sequence used during virtual fabrication of a semiconductor device structure. During virtual fabrication, a pattern that includes multiple metal patterns, associated with metal features, is generated from a first mask. In the local CDU modeling step, each of the metal patterns is identified within the larger pattern and recognized as a separate net. Each net is resized along an interface in an xy direction by generating a random CD variation for that particular metal pattern. After all of the metal nets in the pattern have been resized to account for local CDU, a new "CDU mask" is generated based on the resized nets. The CDU mask may then be used to perform virtual fabrication of the semiconductor device structure that more accurately represents the local CDU of the metal patterns that would be produced during physical fabrication.

Figure 11:
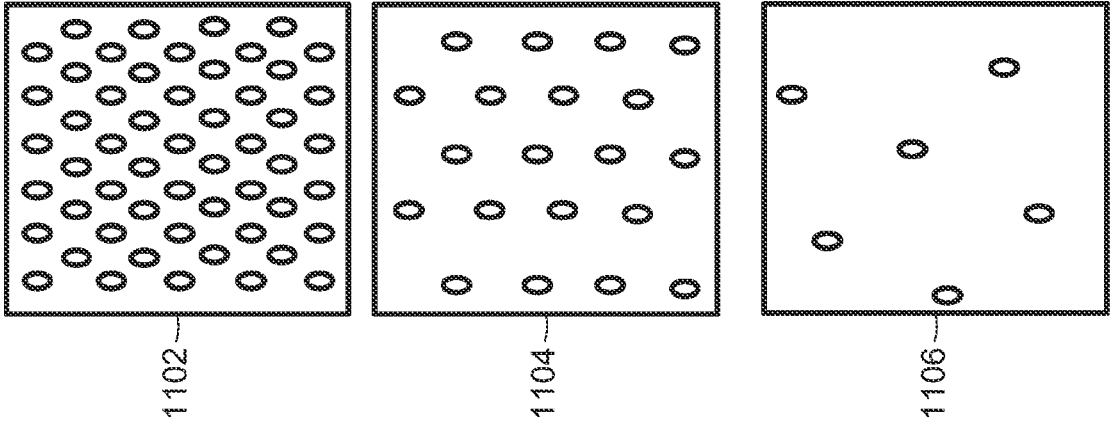
FIG. 11 depicts exemplary types of features for which local CDU may be determined during virtual fabrication.

Embodiments enable local CDU to be determined for a number of different types of features. For example FIG. 11 depicts exemplary types of features for which local CDU may be determined during virtual fabrication. More particularly, FIG. 11 depicts contact holes in an insulating layer for three types of features. A first type of feature, contact holes for anchors 1102, represents a dense pattern. Anchors are metal fillers in a via that metallically connect to a backside metal layer underneath the substrate to improve the adhesion of the backside metal layer to the substrate. The anchors may be clustered for improved strength. Similarly, the Pitch32-1 feature 1104 represents a semi-dense pattern and the Pitch90 feature 1106 represents an isolated (iso) pattern whose density is less than the other two types of features.

FIG. 12 depicts an example of CD variation between an ideal pattern specified in a first mask and the pattern after transfer to the resist. An ideal pattern 1202 specified in a mask has features as shown where the CD for the feature requires equidistant spacing and uniformly sized shapes. However, the exposure, deposition and etching processes involved in replicating the pattern 1204 to the resist results in CD feature variance that alters the CD of the features from the originally specified values. The change in CD for the features in the pattern follows a normal distribution with mean shift and sigma. Chart 1206 graphically depicts the normal distribution of pattern values on the resist following mean shift 1208 and a range of 3sigma 1210 (3 standard deviations) from the shifted mean. Embodiments of the present invention help to properly simulate this behavior in the virtual fabrication environment.

In one embodiment, a selection of a process sequence and related design data for a semiconductor device structure of interest is received in a virtual fabrication environment. The process sequence and/or design data may be manually selected by a user through a provided user interface or may be programmatically provided by the virtual fabrication environment. The process sequence includes a local CDU modeling step which enables local CDU modeling of separate portions of a pattern being generated from a first mask during virtual fabrication of the semiconductor device structure. The result of the local CDU modeling may be used to generate a new CDU mask that can then be utilized in place of the first mask to more accurately perform the virtual fabrication of the semiconductor device structure.

FIG. 13 depicts an exemplary sequence of steps for performing local CDU modeling in an exemplary embodiment. In the virtual fabrication environment, the fabrication process sequence is executed to generate a pattern on the resist using a first mask that includes local metal patterns of metal features (step 1302). Following the generation of the pattern, the virtual fabrication environment executes a local CDU modeling step (step 1303). The local CDU modeling step uses a net recognition algorithm (discussed further below) to find the interface (between metal and air in the xy direction only) in the 3D structural model data for each metal pattern in the overall pattern (step 1304). Each identified metal feature pattern is recognized as a separate metal net (step 1306) by the net recognition algorithm. The deposition/etch rate for each identified metal net is then calculated using a random normal distribution (step 1308). In one embodiment, the CD variation of each net is calculated as Rnet[net]=(np.random.normal (meanshift, sigma))*1.000 using random samples drawn from a numpy array holding net values. The calculated random normal distribution is used to resize each net by first marking a range along the interface of the net (step 1310) and then replacing the material in the marked range with either metal or air (step 1312) to enlarge or shrink the net as described further below. Once all the metal nets in the pattern have been resized, a new mask, referred to herein as a CDU mask, may be generated based on the resized metal nets (step 1314). For example in one embodiment the CDU mask may be generated from the resized metal nets by performing a mask generation operation within the virtual fabrication environment. A graphical user interface may allow a user to select a "create new mask" operation" and specify that it is to be created from selected metal materials on the wafer and the use of the visible top-down surface (created with the original mask) as an input parameter. The new CDU mask is then generated in the same shape as the top view of the resized metal patterns. This new CDU mask is then used by the virtual fabrication environment in place of the original first mask to virtually fabricate the semiconductor device structure of interest.

Figure 14:
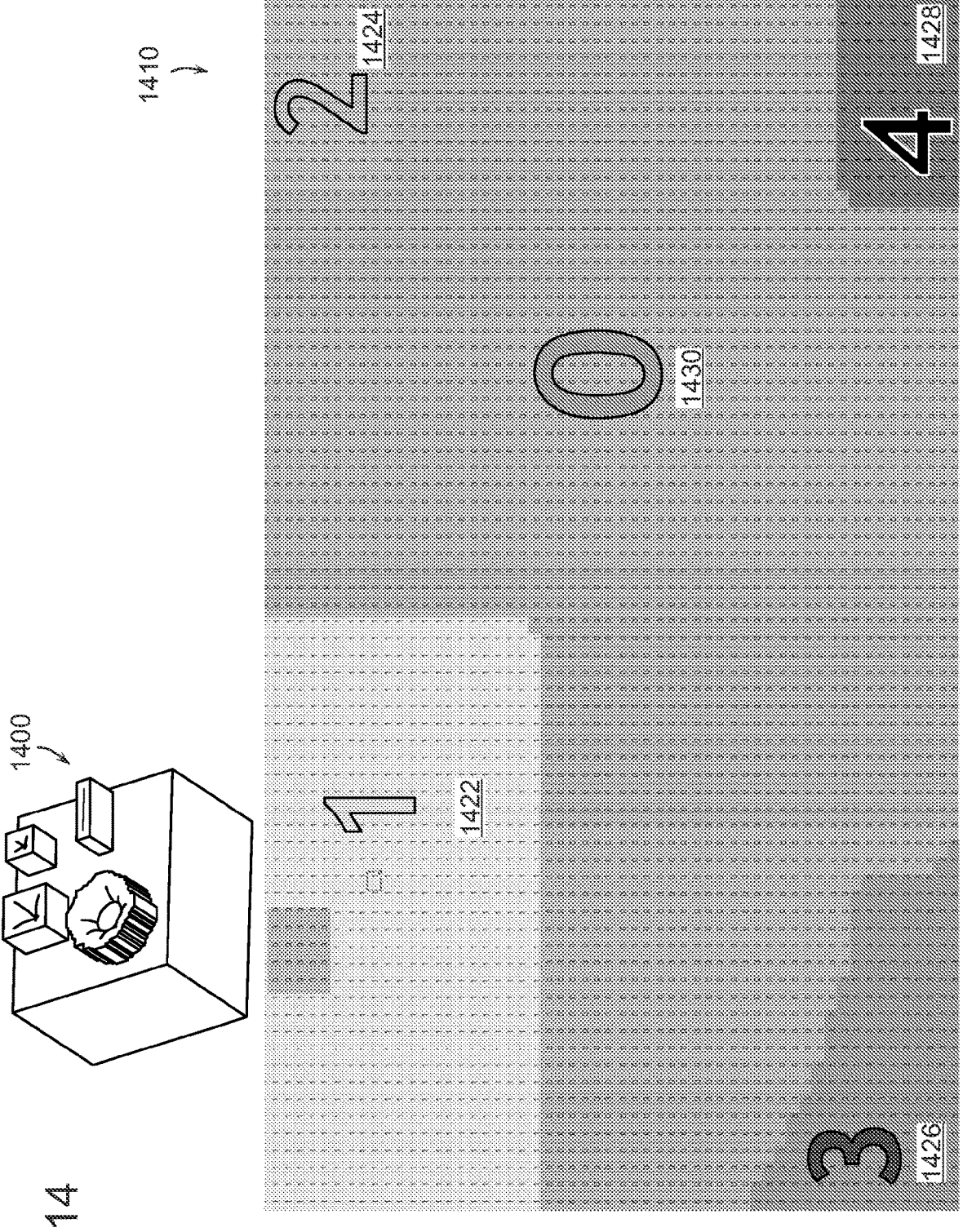
FIG. 14 depicts a pattern with multiple metal patterns that may be examined by a net recognition algorithm in an exemplary embodiment.

In more detail, following the generation of a pattern from a first mask during virtual fabrication, embodiments execute a local CDU modeling step in which a net recognition algorithm (discussed further below) is used to recognize separate metal patterns within the overall pattern. FIG. 14 depicts a pattern with multiple metal patterns that may be examined by a net recognition algorithm in an exemplary embodiment. In FIG. 14, a semiconductor structure of interest 1400 that is being virtually fabricated may have multiple metal features. A first mask is used by the virtual fabrication environment to virtually fabricate a pattern on the photoresist (graphically depicted as pattern 1410), in which metal patterns 1 (1422), 2 (1424), 3 (1426) and 4 (1428) are separated by non-metallic substrate area 0 (1430). It should be appreciated that the pattern 1410 is not to scale and is included for illustration purposes only. The net recognition algorithm called by the local CDU modeling step recognizes metal patterns 1 (1422), 2 (1424), 3 (1426) and 4 (1428) as separate metal nets. The local CDU modeling step then generates random CD variation (that can be negative or positive) for each separate net in the simulation domain. The CD variation follows a normal distribution. In one embodiment, the mean and the sigma can be defined by the user and can be further calibrated by using actual inline Si data gathered from the physical fab. The generation of the random CD variation for each net is discussed further below.

The local CDU modeling step uses the 3D structural model data created by the virtual fabrication process to detect material interfaces and perform net recognition. In one embodiment, the semiconductor device structure being virtually fabricated may be represented using a voxel-based implicit geometry representation. Each voxel identifies one or more materials and may be loaded into a numpy array where binaryzation/trinaryzation takes place to segment the 3D structural model representing the semiconductor device structure. Each element in the numpy array may represent metal, air/void, or other material (e.g. substrate). For example, air/void voxel elements may be assigned a value of 0, metal voxel elements may be assigned a value of 1 and any other locations not corresponding to metal or air may be assigned another value between 0 and 1. The voxel model may be examined to perform interface recognition in order to identify a metal/(air, void) surface voxel identifying those surface voxels at the intersection between metal and air. It should be appreciated that the use of other types of arrays instead of a numpy array are also within the scope of the present invention. The voxel model may also be examined during the local CDU modeling step to perform net recognition as described further below.

Figure 15A:
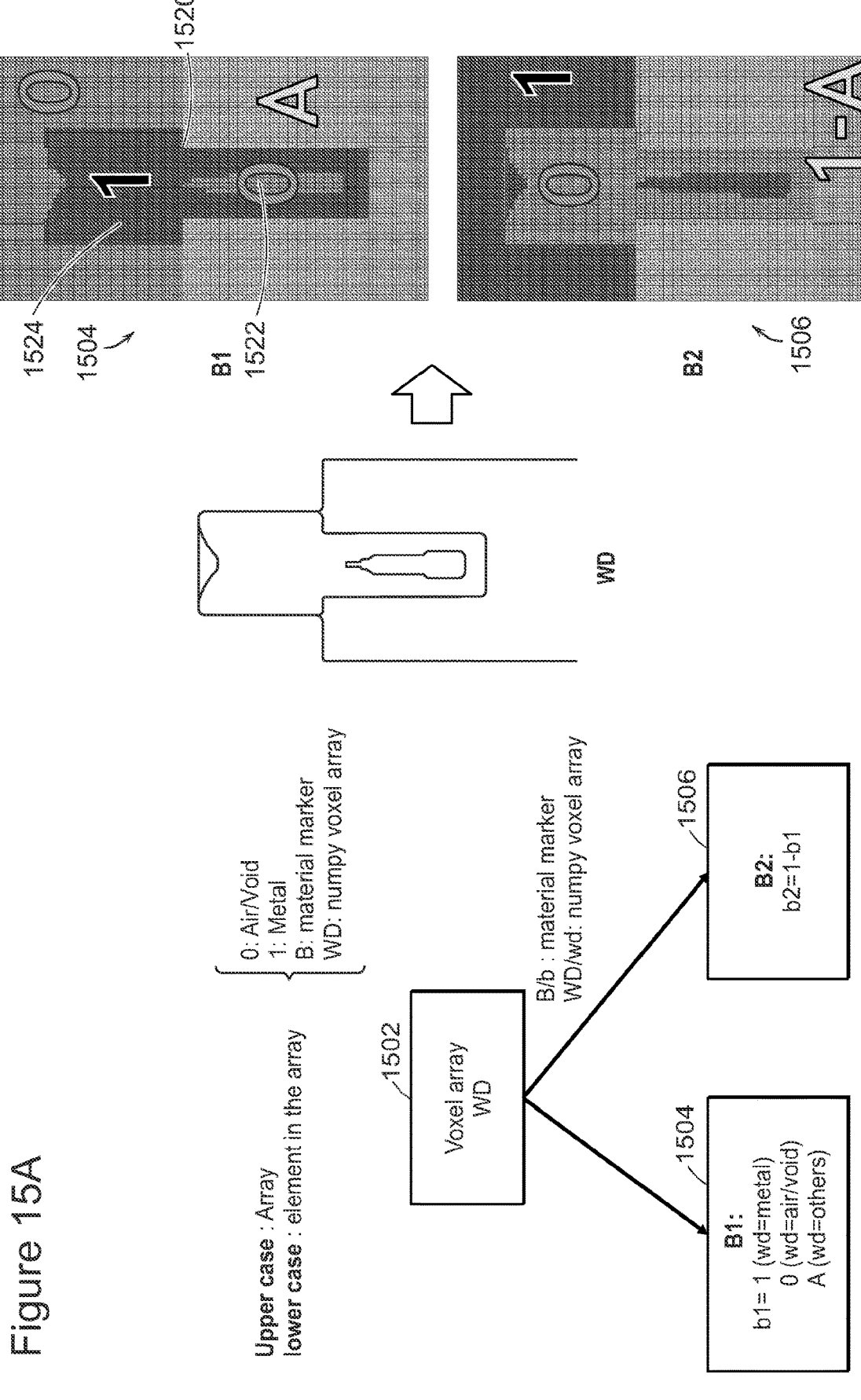
FIG. 15A depicts a voxel numpy array that corresponds to a portion of a 3D model that may be used in an exemplary embodiment.
Figure 15B:
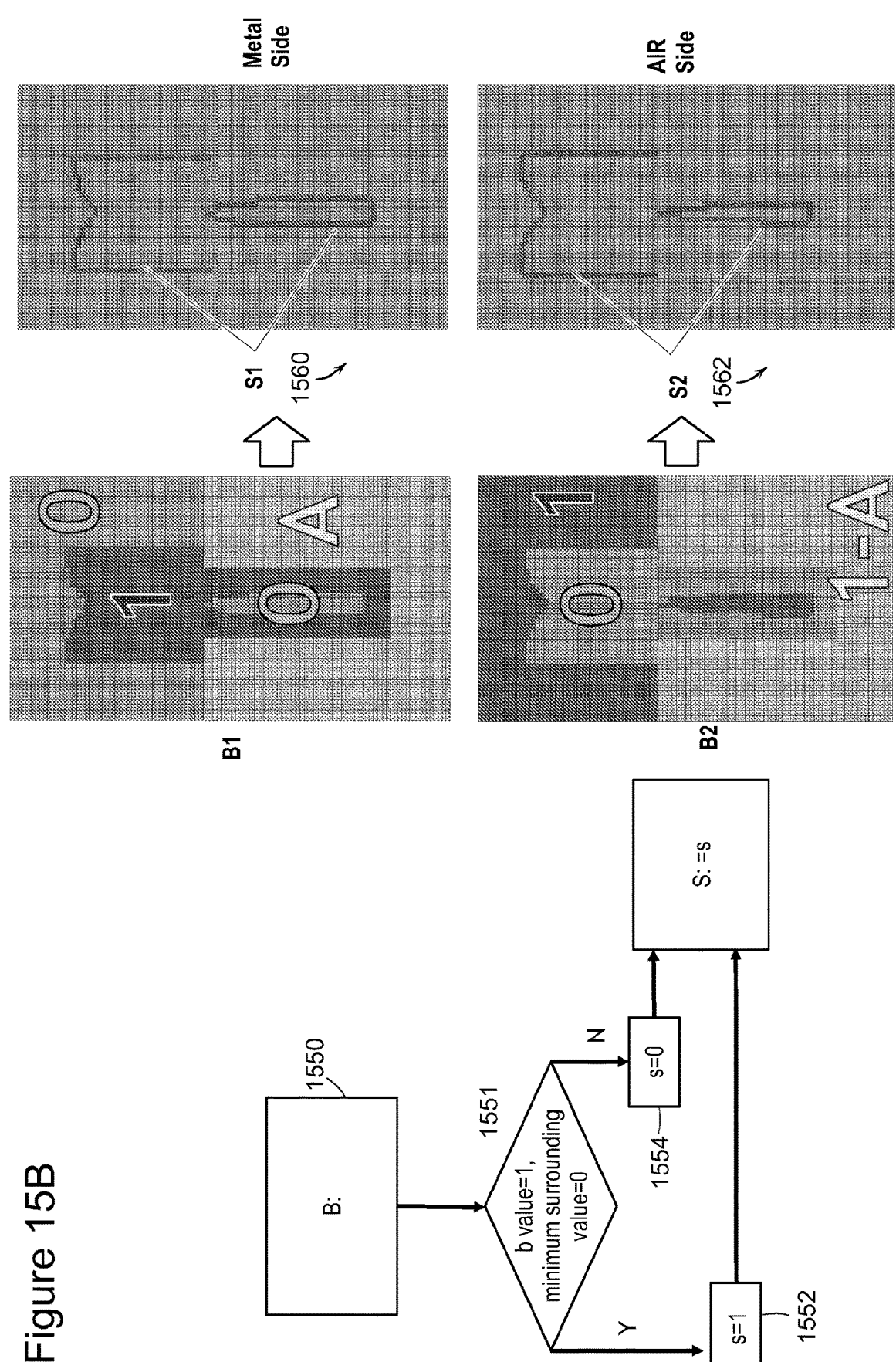
FIG. 15B depicts exemplary interface recognition techniques that may be performed in an exemplary embodiment.

An exemplary use of a numpy array to hold material values and the use of the values in the numpy array in detecting material interfaces is now provided with respect to FIGS. 15A-B. FIG. 15A depicts a voxel numpy array that corresponds to a portion of a 3D model with a trench containing a void in metal. More particularly, a voxel numpy array 1502 holds arrays of elements that correspond to a portion of a 3D model of a trench 1520 containing a void 1522 in metal 1524. The numpy voxel array WD 1502 hold two arrays B1 (1504) and B2 (1506) holding array element values corresponding to trench, metal, void and substrate. It will be appreciated that B2 is a partial inverse/reverse array of the values in B1 (to assist with interface recognition as explained further below) with metal values being replaced by air values and air values being replaced by metal values. For example, if each element b2 in the B2 array is equal to 1−b1, then air voxel values in B1 become 1−0=1 or metal values, metal voxel values become 1−1=0 or air values, and substrate values (assuming a value of 0.5 for A) become 1−0.5=0.5 (and remain unchanged).

FIG. 15B depicts exemplary interface recognition techniques that may be performed in an exemplary embodiment.

The two arrays B1 (1504) and B2 (1506) are used to identify surface markers for the interface of metal and air/void portions of the 3D model. Each array B (i.e. B1 (1504) or B2 (1506)) is examined (step 1550). For each array element b for which the value equals 1, the minimum surround value is examined (step 1551) to determine if the minimum surrounding value is 0. If the minimum surrounding value is 0 (i.e. is a value corresponding to air) then the surface marker element s equals 1 (i.e. the voxel value represents an interface voxel (step 1552). If the minimum surrounding value is not 0 (i.e. is a value corresponding to metal or another material) then the surface marker element s equals 0 (step 1554) (i.e. the voxel value does not represent an interface voxel). Examining each of the array elements in this manner surface markers S1 (1560) and S2 (1562) can be developed to identify the interface between metal and air/void in the model. It will be appreciated that surface markers S1 (1560) and S2 (1562) are very similar and yet not identical due to the implicit nature of voxel representations. Once the interface has been determined, net recognition can be performed.

Figure 15C:
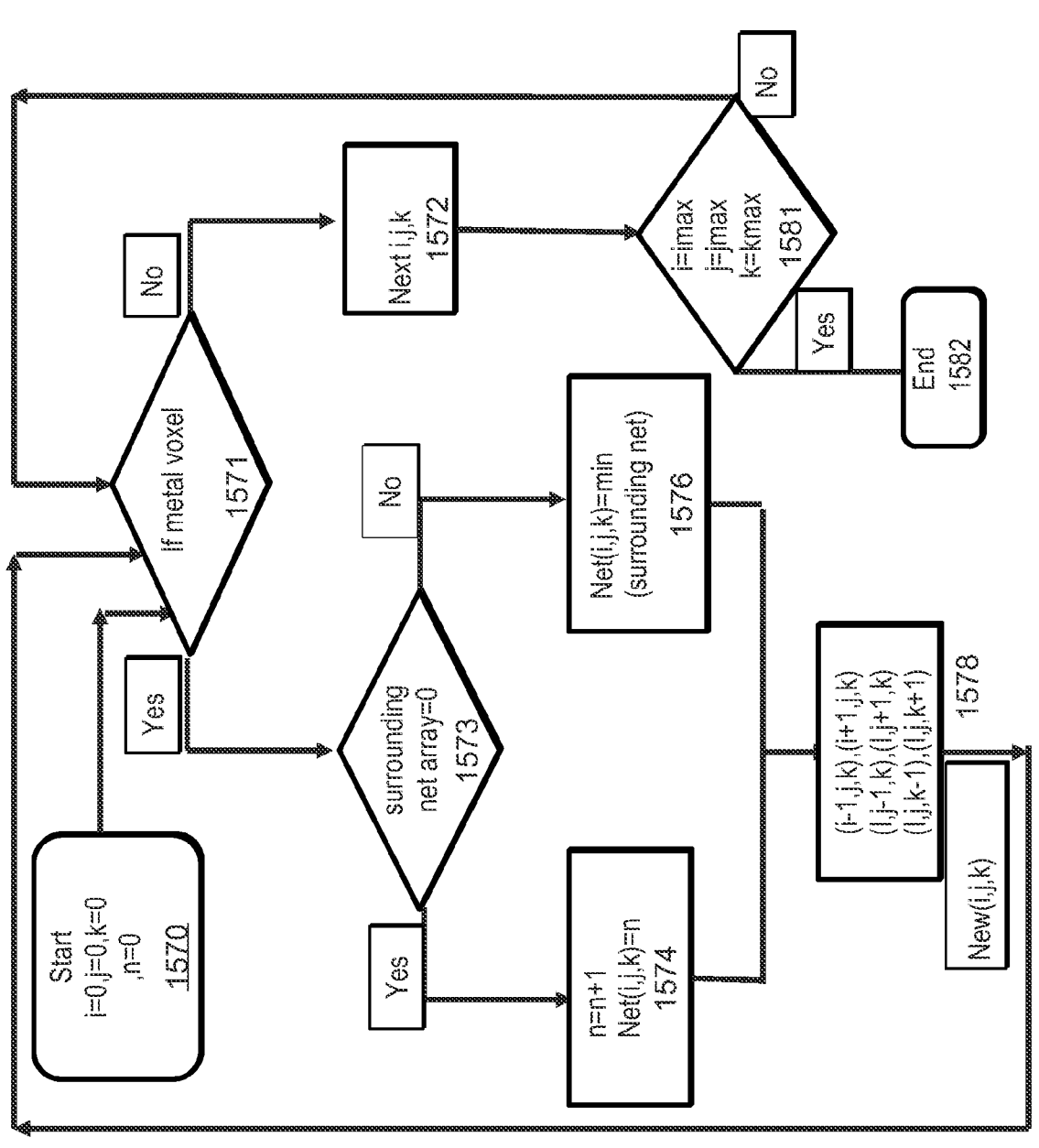
FIG. 15C depicts an exemplary net recognition technique performed in an exemplary embodiment.

In one embodiment, the metal nets located within the pattern are identified from the structural model data as part of the local CDU modeling step. FIG. 15C depicts an exemplary net recognition technique that may be performed in exemplary embodiments. In one embodiment, net recognition is performed as a loop through the values of a voxel array with an index initially set to [0,0,0] (X,Y,Z) (step 1570). During each loop, each voxel element is checked to see if the voxel is filled with metal (i.e. if the array element value corresponds to a metal value) (step 1571). If the value is not a metal value (step 1571), the index values are advanced (step 1572) and checked to see if (X, Y, Z) corresponds to [Xmax, Ymax, Zmax] (step 1581). If the end of the array has not been reached, the process iterates and the next voxel element in the array is checked (step 1571). If the value is a metal value (step 1571), a check is performed to see if its surrounding net marker is 0 (step 1573). A 0 surrounding net marker value indicates that this metal voxel is surrounded with non-metal voxels (or is an un-marked metal voxel), and that this metal voxel should be marked with a new net number (step 1574). If the surrounding net marker for the metal voxel is not 0, it means that this metal voxel is surrounded with at least 1 metal voxel which is already marked with a particular net number. The metal voxel is marked as belonging to the same net (step 1576) because it is connected with the marked metal voxel. After the net marking (step 1574 or step 1576), six identical operations are performed for the metal voxel's six neighborhood voxels by a recursion method (step 1578). As a result, after the recursion, all the nearby voxels in the voxel array have been checked and marked with the net number. Voxels with same net number are recognized as the same net. The process iterates until all voxels in the array have been checked (step 1582).

Figure 16:
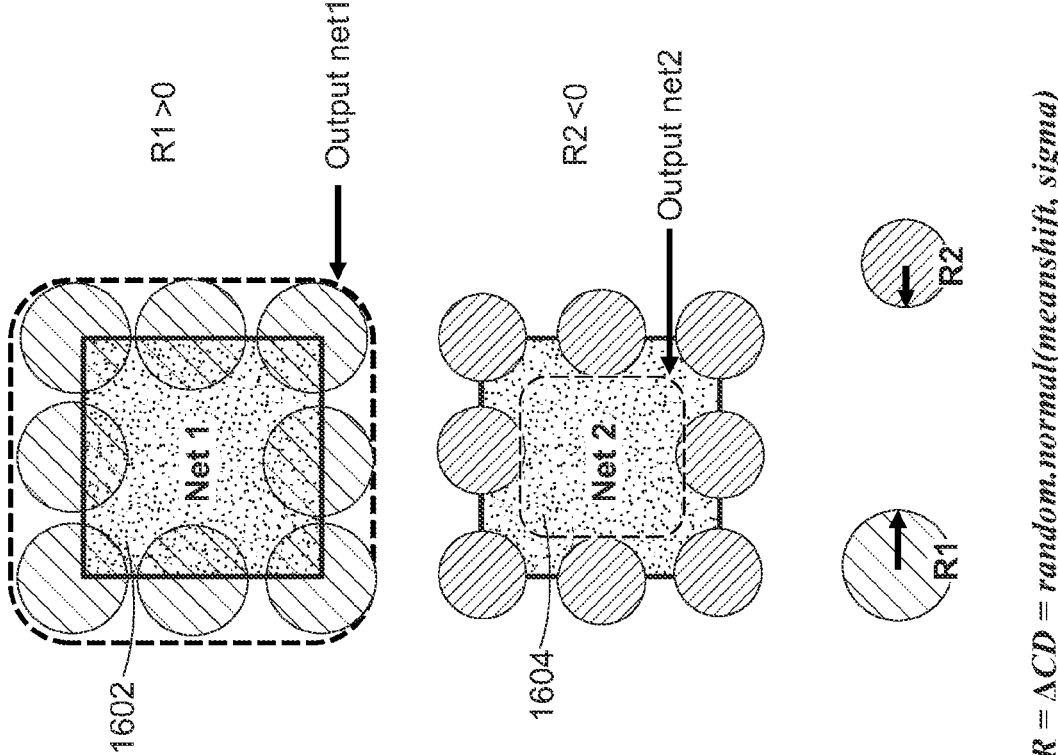
FIG. 16 depicts a resizing process for identified metal nets in an exemplary embodiment.

Once all of the metal nets have been identified in the pattern, the local CDU modeling step resizes the net to approximate local CD variation. FIG. 16 depicts the resizing process for identified metal nets in an exemplary embodiment. To mark the alteration along the interface of the metal net, a range for resizing is marked that either expands or reduces the amount of metal in the model. The local CDU modeling module marks a range to the air side or metal side of the interface. More particularly, a circle with a radius R, where R is set as a random normal distribution, is moved (virtually) along the net interface with the center of the circle on the interface. R is set to be equal to the change in CD which is equal to np.random.normal (meanshift,sigma) (which returns a random sample from a normal (Gaussian) distribution of the metal feature's data stored in the numpy array). In one embodiment, the meanshift and/or sigma may be user-specified parameters provided to the virtual fabrication environment by a user of the virtual fabrication environment. In another embodiment, the meanshift and sigma may be programmatically provided. In one embodiment, the meanshift and sigma values may be manually or programmatically chosen based on results from a physical fab. For example, a particular facility and its equipment may have one type of CD variation that occurs and a second facility and its equipment may experience a second type of CD variation. Embodiments enable this individual behavior to be included in the virtual fabrication process by setting parameters of the local CDU modeling step according to the facility that will be performing the physical fabrication. If the R value is positive, the metal net will be expanded. If the R value is negative, the metal net will be reduced in size. Referring to FIG. 16, a first identified metal net 1602 in the pattern is marked to expand by the range R1 all along the interface. The material values in the voxels in the marked range replace an air value with a metal value thus expanding the contour of the metal net as the metal feature extends further out. Similarly, a second identified metal net 1604 in the pattern is marked to contract by the range R2 all along the interface (because the returned R value was negative). In this case, the voxels in the marked range to the metal side have their metal values replaced by air and the contour of the metal net contracts (i.e. becomes smaller). In this manner each metal pattern can be separately modeled to more closely mimic the type of CD variation that occurs in the physical fab.

Figure 17:
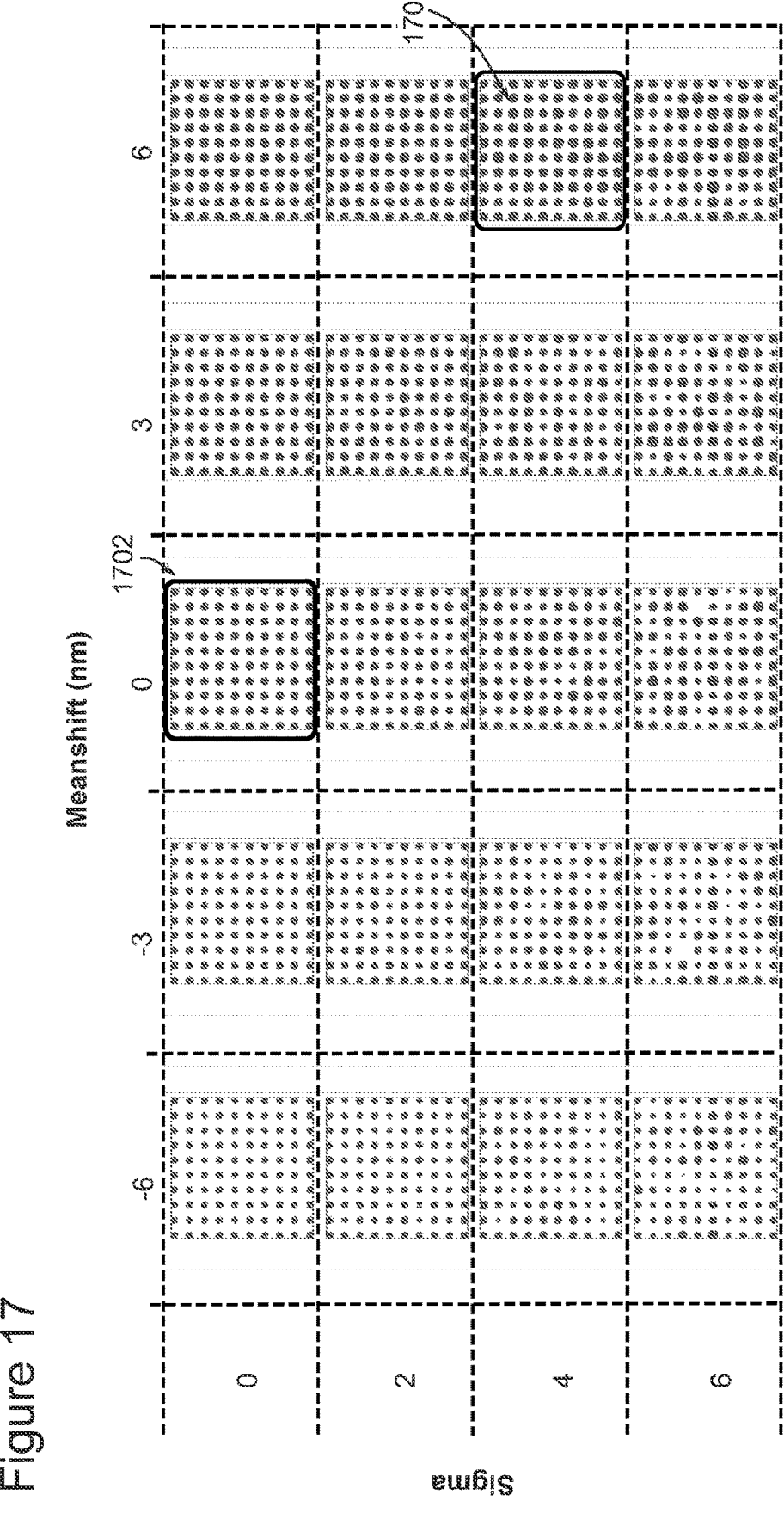
FIG. 17 depicts a chart of results which graphically depicts the effect of selecting different meanshift and sigma values in an exemplary embodiment.

FIG. 17 depicts a chart 1700 of exemplary results which graphically depicts the effect of selecting different meanshift and sigma values in an embodiment. For example, result 1702 depicts the result when a 0 meanshift and 0 sigma are selected. In such a case, the virtual fabrication environment produces an exact duplicate of the feature specified in the original mask. However, as shown, selecting a meanshift of 6 nm and a sigma of 4 generates a result 1704 with significant CD variance with randomly distributed effect.

FIG. 18 depicts an exemplary process sequence 1800 for a semiconductor device structure in an exemplary embodiment. In the process sequence an original mask exposure is followed by metal deposition and exposure to create a pattern on the resist as discussed above. A local CDU modeling step is executed to identify metal nets in the pattern and resize them to account for local CD variation. A new CDU mask is generated from the resized metal nets that incorporates the local CDU information. The virtual fabrication environment then uses the CDU mask to virtually fabricate the semiconductor device structure in a more accurate manner that reflects a normally distributed CD.

Figure 19:
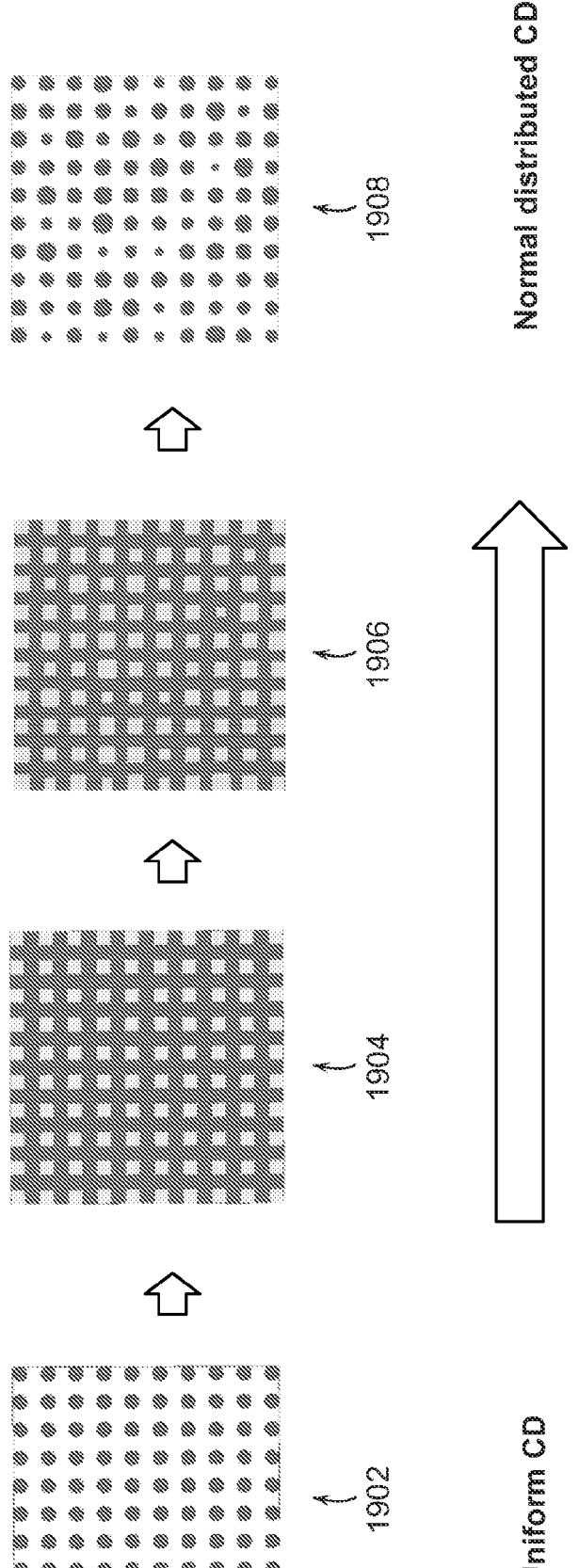
FIG. 19 depicts results of the executed process sequence listed in FIG. 18 in an exemplary embodiment.

The results of the executed process sequence listed in FIG. 18 is graphically depicted in FIG. 19. An original mask exposure 1902 with uniform CD undergoes metal deposition and exposure 1904 to create a metal pattern. Metal nets in the pattern are recognized and the metal CD resized 1906 during the local CDU modeling step. A new mask is then generated based on the resized metal nets and the new CDU mask is used in a new mask exposure which results in a normally distributed CD 1908.

Figure 20A:
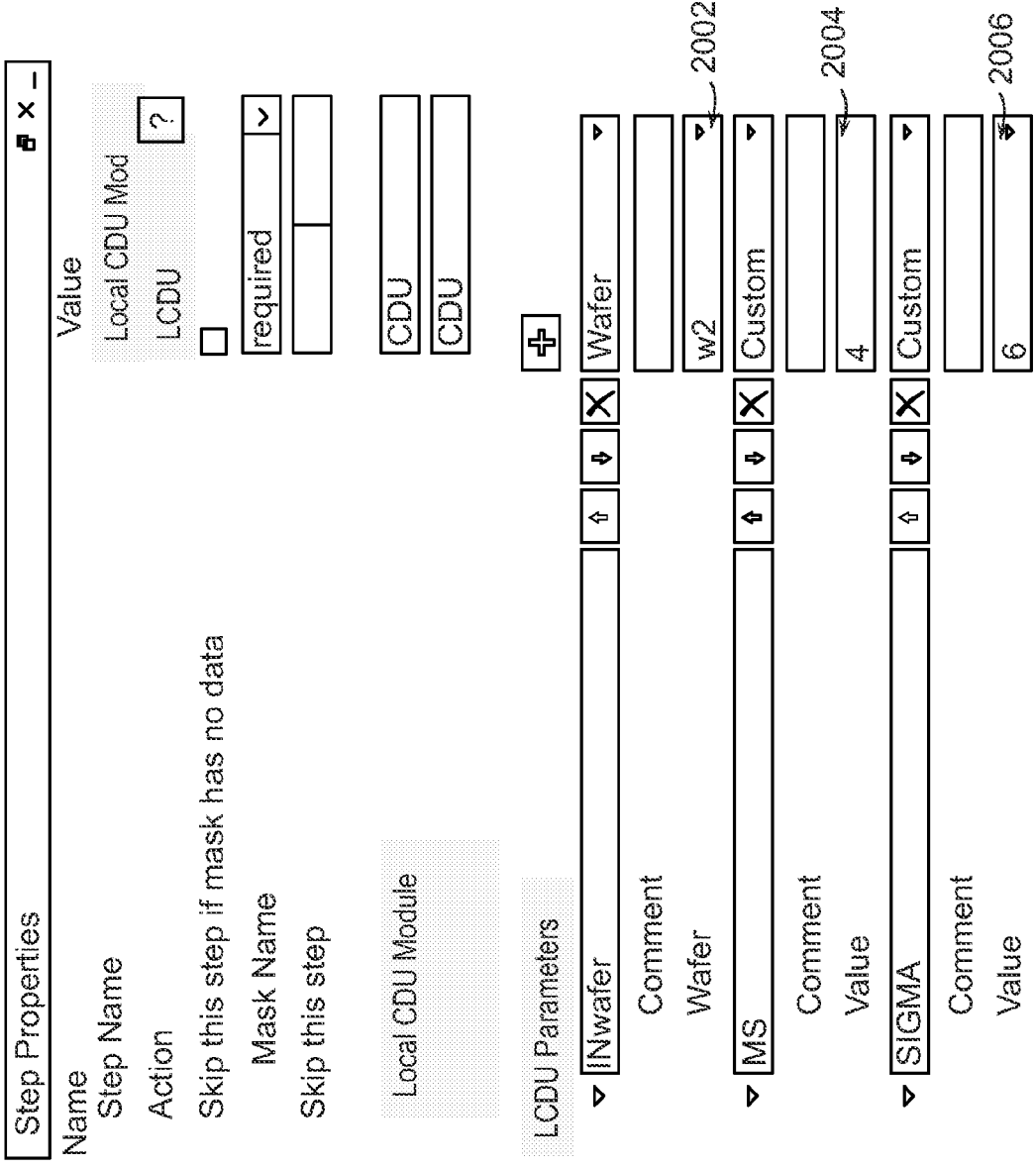
FIG. 20A depicts a graphical user interface provided by the virtual fabrication environment that enables selections of parameters for the local CDU modeling step in an exemplary embodiment.

FIG. 20A depicts a graphical user interface provided by the virtual fabrication environment that enables selections of parameters for the local CDU modeling step in an exemplary embodiment. More particularly as shown, the graphical user interface 2000 enables the selection of a wafer parameter 2002 (wafer 2 is selected), a meanshift parameter 2004 (a meanshift value of 4 nm is selected) and a sigma parameter 2006 (a sigma parameter of 6 sigma is selected).

Figure 20B:
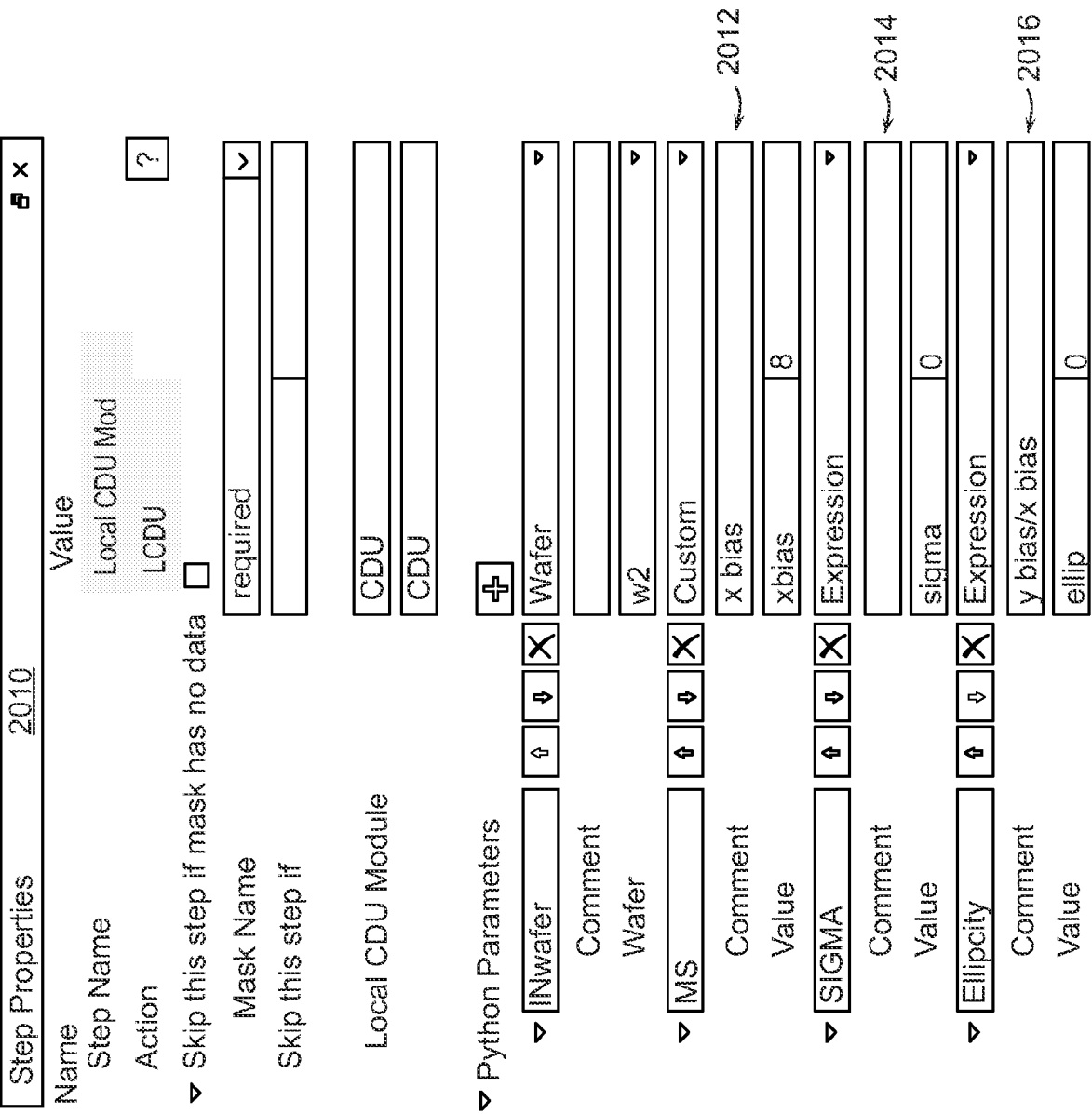
FIG. 20B depicts a graphical user interface provided by the virtual fabrication environment that enables selections of parameters to control ellipticity (ovalness) during the local CDU modeling step in an exemplary embodiment.

Similarly, FIG. 20B depicts a graphical user interface provided by the virtual fabrication environment that enables selections of parameters to control ellipticity (ovalness) during the local CDU modeling step in an exemplary embodiment. More particularly, as shown, the graphical user interface 2010 enables the selection of a meanshift parameter 2012 controlling the mean bias of the metal feature in the x direction, a sigma parameter 2014 controlling sigma in the x direction, and an ellipticity parameter 2016 enabling a user to set a y bias to x bias ratio for a metal feature.

Figure 21:
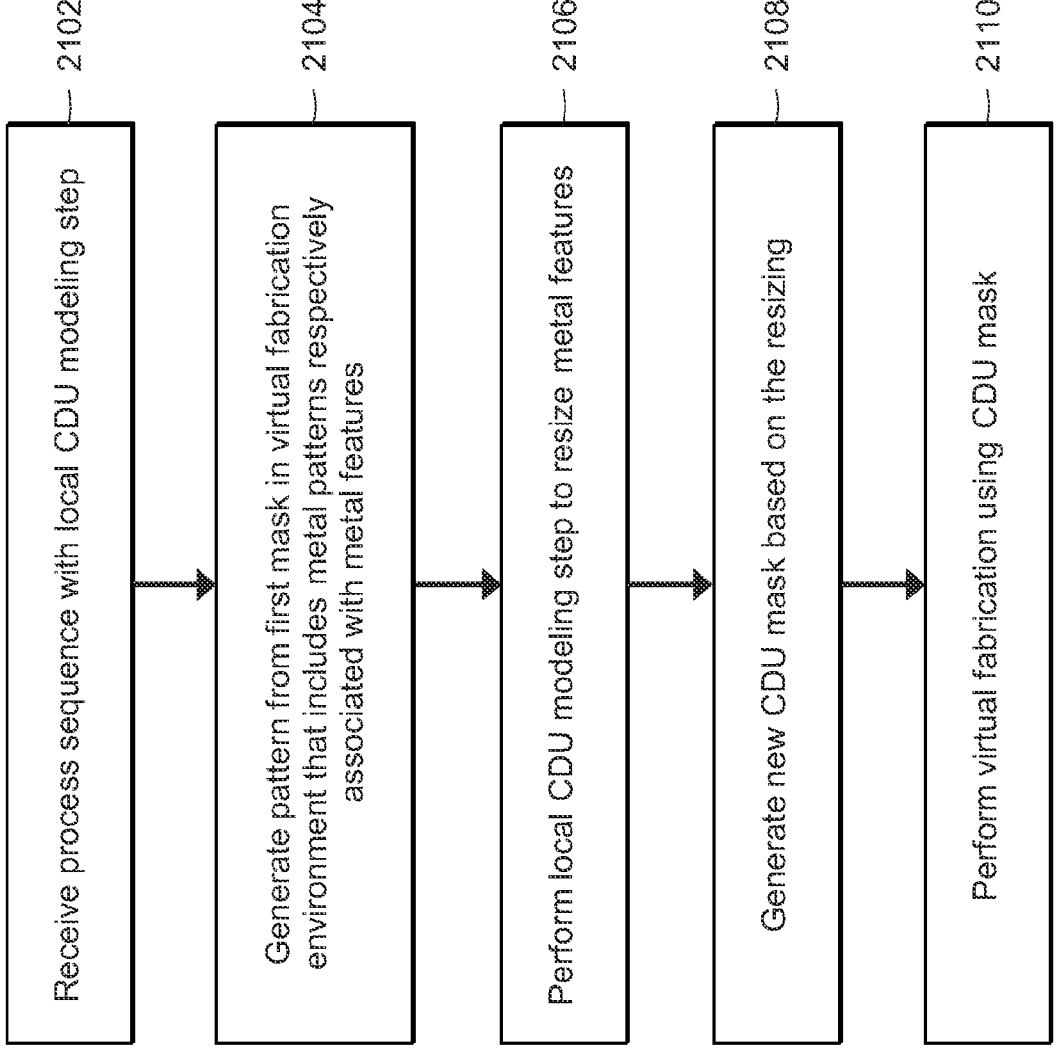
FIG. 21 depicts a sequence of steps performed in the virtual fabrication environment to perform local CDU modeling in an exemplary embodiment.

FIG. 21 depicts an exemplary sequence of steps performed in the virtual fabrication environment to perform local CDU modeling in an exemplary embodiment. The sequence begins by receiving in a virtual fabrication environment a process sequence that includes a local CDU modeling step (step 2102). The virtual fabrication of the semiconductor device structure of interest produces a pattern from a first mask which includes individual metal patterns associated with metal features (step 2104). The local CDU modeling step resizes the metal features in the pattern (step 2106) in the manner discussed above. A new local CDU mask is then generated based on the results of the resizing (step 2108). The new CDU mask is then used in place of the first mask to virtually fabricate the semiconductor device structure of interest (step 2110) to more accurately simulate the local CDU effects that would occur in the physical fab. The results of the virtual fabrication may be displayed to a user via a display surface, exported for further processing or stored for later use.

Although the description herein has focused on voxel-based models simulated by the virtual fabrication environment, it should be appreciated that embodiments of the present invention are not so limited. In some embodiments, the techniques described herein for local CDU modeling may be applied in virtual fabrication environments that do not rely on voxel-based representation of models.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding computing device-executable instructions for performing local Critical Dimension Uniformity (CDU) modeling in a virtual fabrication environment, the instructions when executed causing at least one computing device to:

receive in the virtual fabrication environment a selection of a process sequence and design data for a semiconductor device structure to be virtually fabricated, the process sequence including a local CDU modeling step;

generate, in the virtual fabrication environment during virtual fabrication of the semiconductor device structure, a pattern from a first mask using the process sequence and the design data, the pattern including a plurality of metal patterns, each of the metal patterns associated with a metal feature;

perform the local CDU modeling step to resize the metal features patterns represented in the pattern generated from the first mask to reflect CD variation occurring during fabrication of the semiconductor device structure, wherein resizing the metal patterns represented in the pattern comprises separately resizing nets each corresponding to a metal pattern in the plurality of metal patterns based on a random normal CD variation for the net;

generate a CDU mask based on the resizing; and use the CDU mask to perform virtual fabrication of the semiconductor device structure in the virtual fabrication environment.

2. The medium of claim 1, wherein the local CDU modeling step:

recognizes each of the plurality of metal patterns as a separate net by identifying an interface between metal and air based on the pattern, wherein resizing the nets is based on the identified interface.

3. The medium of claim 1, wherein a meanshift and sigma used in calculating the random normal CD variation are based on CDU data from a fabrication run for the semiconductor device structure conducted using the first mask in a physical fabrication environment.

4. The medium of claim 3, wherein the CDU data from the physical fabrication environment is associated with a particular fabrication facility.

5. The medium of claim 1, wherein the local CDU modeling step includes a user-specified parameter for meanshift.

6. The medium of claim 1, wherein the local CDU modeling step includes a user-specified parameter for sigma.

7. The medium of claim 1, wherein the local CDU modeling step includes a user-specified parameter indicative of ellipticity of a metal feature.

8. A computing device-implemented method for performing local Critical Dimension Uniformity (CDU) modeling within a virtual fabrication environment, the method comprising:

receiving in the virtual fabrication environment a selection of a process sequence and design data for a semiconductor device structure to be virtually fabricated, the process sequence including a local CDU modeling step;

generating, in the virtual fabrication environment during virtual fabrication of the semiconductor device structure, a pattern from a first mask using the process sequence and the design data, the pattern including a plurality of metal patterns, each of the metal patterns associated with a metal feature;

performing the local CDU modeling step to resize the metal features represented in the pattern generated from the first mask to reflect CD variation occurring during fabrication of the semiconductor device structure, wherein resizing the metal patterns represented in the pattern comprises separately resizing nets each corresponding to a metal pattern in the plurality of metal patterns based on a random normal CD variation for the net;

generating a CDU mask based on the resizing; and using the CDU mask to perform virtual fabrication of the semiconductor device structure in the virtual fabrication environment.

9. The method of claim 8, wherein the local CDU modeling step:

recognizes each of the plurality of metal patterns as a separate net by identifying an interface between metal and air based on the pattern, wherein resizing the nets is based on the identified interface.

10. The method of claim 8, wherein a meanshift and sigma used in calculating the random normal CD variation are based on CDU data from a fabrication run for the semiconductor device structure conducted using the first mask in a physical fabrication environment.

11. The method of claim 10, wherein the CDU data from the physical fabrication environment is associated with a particular fabrication facility.

12. The method of claim 8, wherein the local CDU modeling step includes a user-specified parameter for meanshift.

13. The method of claim 8, wherein the local CDU modeling step includes a user-specified parameter for sigma.

14. The method of claim 8, wherein the local CDU modeling step includes a user-specified parameter indicative of ellipticity of a metal feature.

15. A system for performing local Critical Dimension Uniformity (CDU) modeling in a virtual fabrication environment, comprising:

at least one computing device equipped with one or more processors and configured to generate a virtual fabrication environment that is configured to:

receive a selection of a process sequence and design data for a semiconductor device structure to be virtually fabricated, the process sequence including a local CDU modeling step;

generate, during virtual fabrication of the semiconductor device structure, a pattern from a first mask using the process sequence and the design data, the pattern including a plurality of metal patterns, each of the metal patterns associated with a metal feature;

execute the local CDU modeling step to:

resize the metal features represented in the pattern generated from the first mask to reflect CD variation occurring during fabrication of the semiconductor device structure, wherein resizing the metal patterns represented in the pattern comprises separately resizing nets each corresponding to a metal pattern in the plurality of metal patterns based on a random normal CD variation for the net, generate a CDU mask based on the resizing, and use the CDU mask to perform virtual fabrication of the semiconductor device structure; and a display surface in communication with the at least one computing device, the display surface configured to display data generated in the virtual fabrication environment.

16. The system of claim 15 wherein, the local CDU modeling step:

recognizes each of the plurality of metal patterns as a separate net by identifying an interface between metal and air based on the pattern, wherein resizing the nets is based on the identified interface.

17. The system of claim 15, wherein a meanshift and sigma used in calculating the random normal CD variation are based on CDU data from a fabrication run for the semiconductor device structure conducted using the first mask in a physical fabrication environment.

18. The system of claim 17, wherein the CDU data from the physical fabrication environment is associated with a particular fabrication facility.

19. The system of claim 15, wherein the local CDU modeling step includes a user-specified parameter for meanshift.

20. The system of claim 15, wherein the local CDU modeling step includes a user-specified parameter for sigma.

21. The system of claim 15, wherein the local CDU modeling step includes a user-specified parameter indicative of ellipticity of a metal feature.

* * * * *